(12) United States Patent  
Momose et al.

(10) Patent No.: US 7,679,708 B2
(45) Date of Patent: Mar. 16, 2010

(54) RING-SHAPED SEAL FOR LCD AND METHOD FORMED OF FIRST AND SECOND DIFFERENT MATERIAL SEALING MEMBERS WITH RESPECTIVE FIRST AND SECOND CONNECTING PORTIONS EACH HAVING RESPECTIVE FIRST AND SECOND ABUTTING PARTS THAT ARE CONTINUOUS WITH THE SEALING MEMBERS

(75) Inventors: Yoichi Momose, Matsumoto (JP); Satoshi Hasegawa, Matsumoto (JP)

(73) Assignee: Seiko Epson Corporation (JP)

( * ) Notice: Subject to any disclaimer, the term of this patent is extended or adjusted under 35 U.S.C. 154(b) by 444 days.

(21) Appl. No.: 11/316,575

(22) Filed: Dec. 22, 2005

(65) Prior Publication Data

US 2006/0139557 A1    Jun. 29, 2006

(30) Foreign Application Priority Data

Dec. 27, 2004    (JP)    ............... 2004-375690

(51) Int. Cl.
  *G02F 1/1339* (2006.01)
(52) U.S. Cl. .................... 349/153; 349/190
(58) Field of Classification Search ................ 349/153, 349/190
  See application file for complete search history.

(56) References Cited

U.S. PATENT DOCUMENTS

| 6,525,799 | B1* | 2/2003 | Fukuda ........................ 349/157 |
| 6,531,329 | B2* | 3/2003 | Asakura et al. ............... 438/30 |
| 6,674,507 | B2 | 1/2004 | Yoshizoe |
| 6,678,029 | B2* | 1/2004 | Suzuki ........................ 349/154 |
| 7,133,107 | B2* | 11/2006 | Park ........................... 349/153 |
| 7,190,430 | B2 | 3/2007 | Miyazaki et al. |
| 2003/0025867 | A1* | 2/2003 | Yoshizoe ..................... 349/153 |
| 2004/0070722 | A1 | 4/2004 | Park |
| 2004/0125317 | A1 | 7/2004 | Suzuki |
| 2005/0094084 | A1 | 5/2005 | Hsu |
| 2005/0099574 | A1* | 5/2005 | Ueyama ...................... 349/153 |
| 2005/0117106 | A1* | 6/2005 | Tatemura et al. ............ 349/153 |

FOREIGN PATENT DOCUMENTS

| JP | 2002-098979 | 4/2002 |
| JP | 2002-122870 | 4/2002 |

(Continued)

OTHER PUBLICATIONS

Communication from European Patent Office regarding counterpart application.

*Primary Examiner*—John Heyman
(74) *Attorney, Agent, or Firm*—Harness, Dickey & Pierce, P.L.C.

(57) ABSTRACT

A liquid crystal display device includes a first substrate, a second substrate, a liquid crystal layer that is interposed between the first and second substrates, and a sealing member that is formed in peripheral portions of the first and second substrates. The sealing member includes a ring-shaped portion that seals the liquid crystal layer inboard of the sealing member and connecting portions that connect first and second regions of the sealing member to form the ring-shaped portion. The connecting portions are formed outboard of the ring-shaped portion.

9 Claims, 19 Drawing Sheets

FOREIGN PATENT DOCUMENTS

| | | | | | |
|---|---|---|---|---|---|
| JP | 2003-43499 | 2/2003 | KR | 2001-0072397 | 7/2001 |
| JP | 2003-222883 | 8/2003 | KR | 2004-0003548 | 1/2004 |
| JP | 2003-241204 | 8/2003 | TW | 594303 | 11/2003 |
| | | | WO | WO 00/77567 | 12/2000 |

* cited by examiner

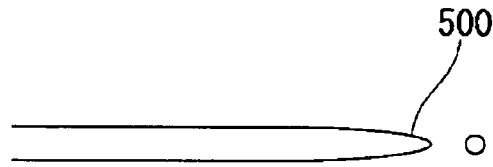
FIG. 26A
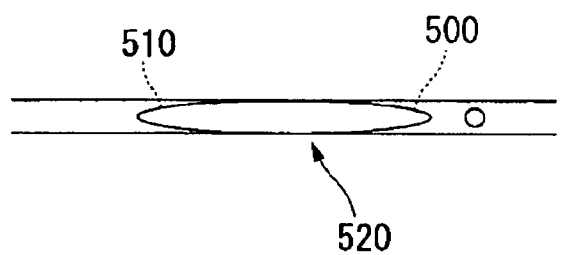
FIG. 26B
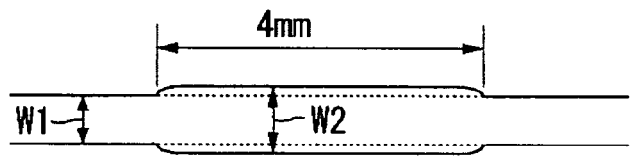
FIG. 26C
• W = W2 - W1 = 0.1 TO 0.2 mm
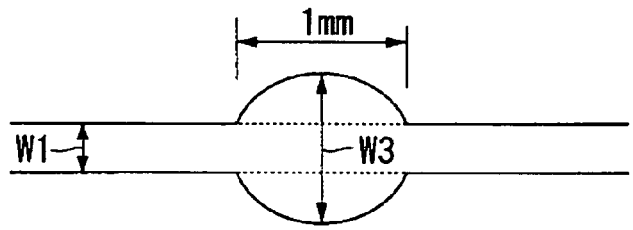
FIG. 26D
• W = W3 - W1 = 0.5 TO 0.6 mm

RING-SHAPED SEAL FOR LCD AND METHOD FORMED OF FIRST AND SECOND DIFFERENT MATERIAL SEALING MEMBERS WITH RESPECTIVE FIRST AND SECOND CONNECTING PORTIONS EACH HAVING RESPECTIVE FIRST AND SECOND ABUTTING PARTS THAT ARE CONTINUOUS WITH THE SEALING MEMBERS

RELATED APPLICATIONS

This application claims priority to Japanese Patent Application No. 2004-375690 filed Dec. 27, 2004 which is hereby expressly incorporated by reference herein in its entirety.

BACKGROUND

1. Technical Field

The present invention relates to a liquid crystal display device, to a method of manufacturing a liquid crystal display device, and to an electronic apparatus.

2. Related Art

In general, an electro-optical device, such as a liquid crystal display device, is used as a color image display unit of an electronic apparatus such as a cellular phone. In the liquid crystal display device, a liquid crystal layer is interposed between a pair of transparent substrates. In a method of manufacturing the liquid crystal display device, first, a sealing member is applied to a peripheral portion of one of the pair of substrates. At that time, an inlet for injecting liquid crystal is formed in a portion of the sealing member. Then, spacers are dispersed into the sealing member, and the two substrates Are bonded to each other with the sealing member interposed therebetween. In this way, a liquid crystal cell is formed in a region surrounded by the pair of substrates and the sealing member. Subsequently, the liquid crystal cell is de-aerated under a vacuum, and the atmosphere of the liquid crystal cell is changed from the vacuum state to an ambient pressure state while the inlet for injecting liquid crystal is dipped into a liquid crystal bath. As such, the liquid crystal flows into the liquid crystal cell by a difference in pressure between the liquid crystal cell and the outside and surface tension. Unfortunately, this method requires a long time to fill the liquid crystal into the liquid crystal cell. In particular, when a large substrate having a diagonal line of larger than 1 m is used, it takes one or more days to fill the liquid crystal.

Therefore, there has been proposed a method of discharging liquid crystal on a substrate provided with a frame-shaped sealing material not having a liquid crystal injecting port and of bonding substrates. In this method, first, a sealing material, such as thermosetting resin, is applied to a peripheral portion of the surface of one substrate. Then, a predetermined amount of liquid crystal is discharged inside the sealing material by a liquid discharging apparatus. Finally, the substrates are bonded to each other with the sealing material interposed therebetween under a vacuum, and the atmosphere of the substrates is changed from the vacuum state to the ambient pressure state. Then, ultraviolet rays are radiated onto the sealing material, or a heating treatment is performed thereon, thereby forming a liquid crystal display device. Thus, unlike the liquid crystal injecting method in the related art, the sealing material is formed in a ring shape without an injection port.

According to this method, after the two substrates are bonded to each other, an ambient pressure is applied to the substrates. Therefore, uniform pressure is applied to the two substrates, which makes it possible to obtain a predetermined cell gap. In addition, the cell gap can be determined by the discharge amount of liquid crystal. For example, when a very small amount of liquid crystal is discharged, a small cell gap is formed, which causes the occurrence of bubbles. On the other hand, when a very large amount of liquid crystal is discharged, a large cell gap is formed, which causes an irregularity of the cell gap. Therefore, it is possible to obtain a uniform cell gap by optimally setting the discharge amount of liquid crystal. In addition, unlike the liquid crystal injecting method according to the related art, this method makes it possible to reduce the amount of liquid crystal used and thus to shorten the time required for an injecting/sealing process, resulting in a short tact-time.

Further, a sealing member forming method using a dispenser has been proposed (for example, JP-A-2002-98979, JP-A-2003-222883, and JP-A-2003-241204). In this method, a sealing member is formed in a predetermined pattern on a substrate while moving the dispenser relative to the substrate. Here, for the sealing member discharged on the substrate to have a ring-shaped pattern, a sealing member previously discharged in a part of a peripheral portion of the pattern overlaps a sealing member discharged later. In this way, when the substrates are bonded to each other after the liquid crystal is discharged, it is possible to prevent the liquid crystal from leaking to the outside of the ring-shaped pattern of the sealing member.

However, the inventors found out that the liquid crystal display device disclosed in the related art had the following problems: it is difficult to stably form the sealing member; it is necessary to form dummy spacers between adjacent panels; and it is necessary to control the dispenser when a sealing member forming process starts and ends in order to form one pattern in one forming operation. In addition, the inventors found out that a general method of forming a sealing member using a dispenser had a problem in that the irregularity of a cell gap easily occurs.

The inventors obtain the following knowledge from the sealing member discharging method using the dispenser.

In the above-mentioned discharging method, as shown in FIGS. 26A and 26B, it is necessary that a sealing member forming start portion 500 and a sealing member forming end portion 510 be formed to have the same thickness as those of the other portions. The reason is that, when the thicknesses thereof are excessively large, a large cell gap is formed, resulting in display irregularity, and when the thicknesses thereof are excessively small, liquid crystal is leaked from those portions, resulting in low reliability. Therefore, when the sealing member is formed by the dispenser, generally, the sealing member may be formed to be large or small by the sealing member forming start portion 500 and the sealing member forming end portion 510, as shown in FIGS. 26A and 26B. Therefore, as shown in FIG. 26C, in order to make the thickness of a connecting portion 520 uniform, the sealing member forming start portion 500 generally overlaps the sealing member forming end portion 510. In this case, it is confirmed that the overlapping portion needs to have a length of about 4 mm, and a width W2 of the overlapping portion becomes larger than a predetermined width W1 by about 0.1 to 0.2 mm ($\Delta W = W2 - W1 = 0.1$ to 0.2 mm) due to a variation in the viscosity of the sealing member.

Further, in a liquid crystal display device driven by TFDs (thin film diodes) or a liquid crystal display device in which STN (super twisted nematic) liquid crystal is operated by a passive driving method, as shown in FIGS. 27 and 28, it is necessary that lead wiring lines 601 formed on the surface of a circuit board having driver ICs 600 and 610 thereon and common electrodes (hereinafter, referred to as COM electrodes) 602 formed on a counter substrate be electrically connected to connection pads 603. In this case, conductive particles, spacers, on which a coating process is performed, are dispersed into a sealing member, and the sealing member is arranged on the connection pads 603. In this way, the lead wiring lines 601 and the COM electrodes 602 are electrically connected to each other through the conductive particles, so that an output voltage from the driver ICs 600 is applied to wiring lines on the counter substrate.

Meanwhile, it is necessary that the sealing member be formed to cross segment electrodes (hereinafter, referred to as SEG electrodes) 604 extending from the driver IC 610 to a display area 620 and the lead wiring lines 601 extending from the driver ICs 600 to the connection pads 603. In this case, in order to prevent the lead wiring lines 601 and the SEG electrodes 604 from being electrically connected to each other, a sealing member not containing conductive particles crosses the lead wiring lines 601 and the SEG electrodes 604.

When both the sealing member containing the conductive particles and the sealing member containing the non-conductive particles are used, it is necessary that the two sealing members be connected to each other between an end of the connection pad 603 (which is represented by a character 'A' in FIG. 28) and a portion where the COM electrode 601 crosses the sealing member (which is represented by a character 'B' in FIG. 28). In the liquid crystal display device using the TFDs or the STN liquid crystal display device, generally, a distance L between the two portions is smaller than 2 mm. Therefore, when the distance is smaller than the length of the overlapping portion, 4 mm, shown in FIG. 26C, it is confirmed that the overlapping portion of the connecting portion 520 has a length of 1 mm, and a width W3 of the overlapping portion is larger than the predetermined width W1 by about 0.5 to 0.6 mm (ΔW=W3−W1=0.5 to 0.6 mm), which causes the irregularity of a cell gap.

In the method disclosed in JP-A-2002-98979, the width of an overlapping portion of a start portion and an end portion of a sealing line is 0.4 to 0.6 times the width of the sealing line. However, in this method, it is very difficult to control a dispenser, and thus it takes a long time to form the sealing member. In addition, the shape of the sealing member may be varied due to a variation in the amount of the sealing member remaining in the dispenser or a variation in viscosity between the lots of the sealing member, which causes trouble in managing the dispenser.

Further, in the method disclosed in JP-A-2003-222883, the formation of a sealing member starts from any portion at the outside of the sealing member having a closed loop shape, and the formation thereof is terminated in another portion at the outside of the sealing member having the closed loop shape, which is different from the sealing member formation start portion. However, this method has a problem in that dummy spacers should be provided between adjacent panels. In addition, in JP-A-2002-98979, JP-A-2003-222883, and JP-A-2003-241204, since only one member is formed by one sealing member forming operation, it takes a long time to control the dispenser when the formation of the sealing member starts or is terminated, which results in a long tact time.

SUMMARY

An advantage of some aspects of the invention is that it provides a liquid crystal display device capable of forming a uniform cell gap, a method of manufacturing a liquid crystal display device, and an electronic apparatus.

According to an aspect of the invention, a liquid crystal display device includes a first substrate; a second substrate; a liquid crystal layer that is interposed between the first and second substrates; and a sealing member that is formed in peripheral portions of the first and second substrates. The sealing member includes a ring-shaped portion that seals the liquid crystal layer inboard of the sealing member; and connecting portions that connect first and second regions of the sealing member to form the ring-shaped portion. The connecting portions are formed outboard of the ring-shaped portion.

In the above-mentioned structure, the first region and the second region constitute the sealing member, and are connected to each other in the connecting portions. The connecting portions where the first and second regions are connected to each other block up the ring-shaped portion to prevent the liquid crystal from leaking from the inside of the ring-shaped portion to the outside thereof. In the connecting portions, the first region and the second regions may be connected to each other in the vertical direction of the substrate, or they may be connected to each other in the horizontal direction thereof. A part of each connecting portion is formed outboard of the ring-shaped portion, and thus the connecting portion is formed to extend a part constituting the ring-shaped portion to the outside thereof. Therefore, the entire connecting portion is not formed on the ring-shaped portion, but only a part of the connecting portion contributes to the connection of the ring-shaped portion. In addition, the other parts thereof are formed to extend toward the outside of the ring-shaped portion.

According to this structure, since the ring-shaped portion is blocked up by parts of the connecting portions, it is possible to prevent the liquid crystal from leaking from the connecting portions and thus to improve the reliability of a liquid crystal display device. In addition, the connecting portions are formed to extend toward the outside of the ring-shaped portion. Therefore, when the first substrate and the second substrate are bonded to each other, the connecting portions have large widths at only the outside of the ring-shaped portion, which makes it possible to prevent the sealing member from protruding toward the inside of the ring-shaped portion. Further, it is possible to maintain a uniform cell gap, without having an effect on the cell gap inside the ring-shaped portion. More specifically, when the sealing member protrudes toward the inside of the ring-shaped portion, the sealing member may be placed on a color filter in the display region of the liquid crystal display device. In this case, the sealing member may have an effect on a cell gap. In contrast, according to the invention, the sealing member is formed outboard of the ring-shaped portion, that is, in a region where the color filter is not formed. Therefore, the sealing member is not placed on the color filter, which makes it possible to maintain a uniform cell gap.

Furthermore, compared with the related art, it is unnecessary to adjust the widths of the ring-shaped portion and the connecting portions, and the ring-shaped portion and the connecting portions can be formed of members having the same width, which makes it possible to easily form the sealing member.

Further, in the above-mentioned aspect, preferably, the sealing member includes one (continuous) member, and the ring-shaped portion holds the liquid crystal layer in a portion surrounded by the one member in a ring shape. In addition, it is preferable that one end of the one member and the other end thereof be connected to each other by one connecting portion.

Here, 'the sealing member composed of one member' means a member formed by continuously discharging a sealing material from a start portion to an end portion or a member formed by discharging a sealing material at one time, not a sealing member composed of a first sealing member and a second sealing member, which will be described later.

In this way, it is possible to obtain the same effects as those in the above-mentioned liquid crystal display device and to achieve a liquid crystal display device having a sealing member composed of one member. In addition, in this case, since the ring-shaped portion is blocked up by a connecting portion for connecting one end and the other end of the sealing member, it is possible to reduce the number of connecting portions to the minimum and thus to achieve a liquid crystal display device capable of more reliably prevent the irregularity of a cell gap, compared with a liquid crystal display device having a plurality of connecting portions.

Further, in the above-mentioned structure, it is preferable that the sealing member be composed of a first sealing member and a second sealing member, that the ring-shaped portion hold the liquid crystal layer in a portion surrounded by the first and second sealing members in a ring shape, and that two sealing members connect ends of the first sealing member to ends of the second sealing member.

According to this structure, it is possible to obtain the same effects as those in the above-mentioned liquid crystal display device and to achieve a liquid crystal display device having a sealing member composed of the first sealing member and the second sealing member. In addition, when the sealing member includes one member, it is difficult to form the ring-shaped portion and the connecting portion with different sealing materials. However, according to this structure, it is possible to select sealing materials for the first and second sealing members. Thus, a specific portion of the sealing member can be selectively formed of the first sealing member or the second sealing member.

Furthermore, in the above-mentioned structure, it is preferable that the first sealing member be formed of a conductive material, and be formed in a conductive region for connecting a first conductive portion on the first substrate to a second conductive portion on the second substrate.

According to this structure, it is possible to obtain the same effects as those in the above-mentioned liquid crystal display device. In addition, the sealing between the first substrate and the second substrate can be achieved by the first sealing member formed in the conductive region, and the first connecting portion and the second connecting portion can be electrically connected to each other by the first sealing member. In this case, it is preferable that the sealing material for the first sealing member contain conductive particles or resin particles whose surfaces are coated. In this way, when the first substrate and the second substrate are bonded to each other, the first connecting portion and the second connecting portion press the conductive particles, which makes it possible to electrically connect the first connecting portion to the second connecting portion.

Moreover, in the above-mentioned structure, it is preferable that the second sealing member be formed of an insulating material, and be formed in a non-conductive region for electrically isolating the first substrate from the second substrate.

According to this structure, it is possible to obtain the same effects as those in the above-mentioned liquid crystal display device. In addition, the sealing between the first substrate and the second substrate can be achieved by the second sealing member formed in the non-conductive region, and the first substrate can be electrically insulated from the second connecting portion in the non-conductive region by the second sealing member.

The sealing member includes the first conductive sealing member and the second insulating sealing member, and thus it is possible to form a ring-shaped portion having a conductive property and an electrical insulating property, and to form connecting portions where the conductive member and the insulating member are connected to each other. In this case, the connecting portions are formed between the conductive region and the non-conductive region. However, since the connecting portions are formed so as to extend toward the outside of the ring-shaped portion, the connecting portions have large widths at only the outside of the ring-shaped portion when the first substrate and the second substrate are bonded to each other, which makes it possible to prevent the sealing member from protruding toward the inside of the ring-shaped portion. Further, it is possible to maintain a uniform cell gap, without having an effect on the cell gap inside the ring-shaped portion.

Further, according to another aspect of the invention, there is provided a method of manufacturing a liquid crystal display device including a first substrate, a second substrate, a liquid crystal layer that is interposed between the first and second substrates, and a sealing member that is formed at peripheral portions of the first and second substrates. The method includes forming the sealing member including a ring-shaped portion that seals the liquid crystal layer inboard thereof and connecting portions that connects first and second regions of the sealing member to form the ring-shaped portion; and forming the liquid crystal layer inboard of the sealing member. In the manufacturing method, in the forming the sealing member, the connecting portions are formed outboard of the ring-shaped portion.

The forming the sealing member is performed by a method of discharging a sealing material from nozzles of a dispenser while moving the dispenser filled with the sealing material relative to the first substrate or the second substrate.

The forming the sealing member allows the ring-shaped portion to be blocked up by the connecting portions, which makes it possible to prevent a liquid crystal material from leaking from the connecting portion and thus to improve the reliability of a liquid crystal display device. In addition, parts of the connecting portions are used to block up the ring-shaped portion, and the other parts thereof are formed outboard of the ring-shaped portion. Therefore, even when the widths of the connecting portions increase by the bonding between the first substrate and the second substrate, the connecting portions have large widths at only the outside of the ring-shaped portion, which makes it possible to prevent the sealing member from protruding toward the inside of the ring-shaped portion. Further, it is possible to maintain a uniform cell gap, without having an effect on the cell gap inside the ring-shaped portion.

Further, compared with the related art, it is unnecessary to adjust the widths of the ring-shaped portion and the connecting portions, and the ring-shaped portion and the connecting portions can be formed of members having the same width. As a result, it is possible to easily control the dispenser and thus to complete the formation of a sealing member at a short time. In addition, it is unnecessary to consider a variation in the amount of the sealing member remaining in the dispenser or a variation in viscosity between the lots of the sealing member, which makes it possible to easily manage the shape of the sealing member.

Furthermore, in the above-mentioned aspect, preferably, a first mother board having a plurality of first element regions thereon is cut along mutual boundary portions of the plurality of first element regions, and the first substrate is obtained from the first element region. Similarly, a second mother board having a plurality of second element regions thereon is preferably cut along mutual boundary portions of the plurality of second element regions, and the second substrate is obtained from the second element region.

In this way, it is possible to obtain the same effects as those in the above-mentioned manufacturing method, and a plurality of liquid crystal display devices each having the first substrate and the second substrate can be manufactured by cutting the first mother board and the second mother board into a plurality of first and second element regions. As a result, it is possible to achieve a manufacturing method having high productivity.

Moreover, in the above-mentioned aspect, the forming the sealing member includes forming a first sealing member constituting parts of the ring-shaped portion and the connecting portions; and forming a second sealing member constituting the other parts of the ring-shaped portion and the connecting portions after forming the first sealing member.

In this way, it is possible to obtain the same effects as those in the above-mentioned manufacturing method and to achieve a liquid crystal display device having a sealing member composed of the first sealing member and the second sealing member. When the sealing member includes only one member, it is difficult to form the ring-shaped portion and the connecting portion with different sealing materials. However, according to this aspect, it is possible to select sealing materials for the first and second sealing members. Thus, only a specific portion of the sealing member can be formed of the first sealing member or the second sealing member.

Further, in the above-mentioned aspect, it is preferable that, in the forming the first sealing member, the first sealing member be continuously and collectively formed on the plurality of first element regions and the mutual boundary portions of the first mother board in a direction in which the first element regions are arranged, or the first sealing member be continuously and collectively formed on the plurality of second element regions and the mutual boundary portions of the second mother board in a direction in which the second element regions are arranged.

Furthermore, in the above-mentioned aspect, it is preferable that, in the forming the second sealing member, after forming the first sealing member, the second sealing member be continuously and collectively formed on the plurality of first element regions and the mutual boundary portions of the first mother board in a direction in which the first element regions are arranged, or the second sealing member be continuously and collectively formed on the plurality of second element regions and the mutual boundary portions of the second mother board in a direction in which the second element regions are arranged.

In this way, the sealing member can be collectively formed in the direction in which the plurality of first element regions and the plurality of second element regions are arranged by a single process from the start of the formation of the first sealing member to the end of the formation of the first sealing member and a single process from the start of the formation of the second sealing member to the end of the formation of the second sealing member, which makes it possible to achieve a manufacturing method having high productivity.

Meanwhile, when the sealing member is formed in the plurality of first element regions and the plurality of second element regions, a sealing member forming start process and a sealing member forming end process should be performed on each element region. Therefore, the sealing member forming start process and the sealing member forming end process must be repeatedly performed on the plurality of first element region or the plurality of second element region. In this case, discharge and non-discharge of the sealing material are continuously performed, which makes it difficult to allow the sealing material to stably flow in the dispenser, resulting in a variation in the discharge amount of a sealing material. In addition, the dispenser has to scan the first mother board and the second mother board, which causes the operation of the dispenser to be complicated.

In contrast, in this aspect, the first sealing member and the second sealing member are continuously and collectively formed in the direction in which the first element regions and the second element regions are arranged. Therefore, the sealing member forming start process or the sealing member forming end process is performed for every column or row of the first element regions or the second element regions, which makes it possible to reduce the number of sealing member forming start processes and the number of sealing member forming end processes. In this way, it is possible to continuously and collectively form the first sealing member and the second sealing member while causing the sealing material to stably flow in the dispenser, and to form the sealing member at a short time. Since the dispenser does not scan the first element regions or the second element regions in a non-discharge state, it is possible to prevent the sealing material filled into the dispenser from being uselessly discharged. Thus, it is possible to simplify the operation of the dispenser and to reduce a variation in the viscosity of a sealing material or a variation in the discharge amount thereof.

Further, the sealing members formed in the first element regions and the second element regions by the above-mentioned method are connected to each other by the connecting portions. Therefore, it is possible to prevent a liquid crystal material from leaking between adjacent regions.

Furthermore, it is preferable that, in the forming the second sealing member and the forming the second sealing member, the ring-shaped portion be formed such that the length of the first sealing member is equal to that of the second sealing member.

In the above-mentioned aspect, when the relative transfer speed between the dispenser and the first substrate (the first mother board) is equal to that between the dispenser and the second substrate (the second mother board) and the amount of a sealing material discharged from the dispenser to the first substrate for unit time is equal to that of a sealing material discharged from the dispenser to the second substrate for unit time, the same time is needed to form the first sealing member and the second sealing member having the same length. Thus, it is possible to make the tack times require for the first and second sealing members coincide with each other.

Moreover, in the above-mentioned aspect, it is preferable that the forming the first sealing member be performed on the first mother board or the second mother board, and that the forming the second sealing member be performed on the other mother board. In addition, preferably, the forming the first sealing member and the forming the second sealing member are performed on only one of the first mother board and the second mother board.

In this way, it is possible to obtain the same effects as those in the above-mentioned manufacturing method.

According to still another aspect of the invention, an electronic apparatus includes the above-mentioned liquid crystal display device.

According to this aspect, it is possible to provide an electronic apparatus including a display unit capable of displaying high-quality images with high reliability.

BRIEF DESCRIPTION OF THE DRAWINGS

The invention will be described with reference to the accompanying drawings, wherein like numbers reference like elements.

FIGS. 26A to 26D are diagrams illustrating the related art.

DESCRIPTION OF EXEMPLARY EMBODIMENTS

Figure 1:
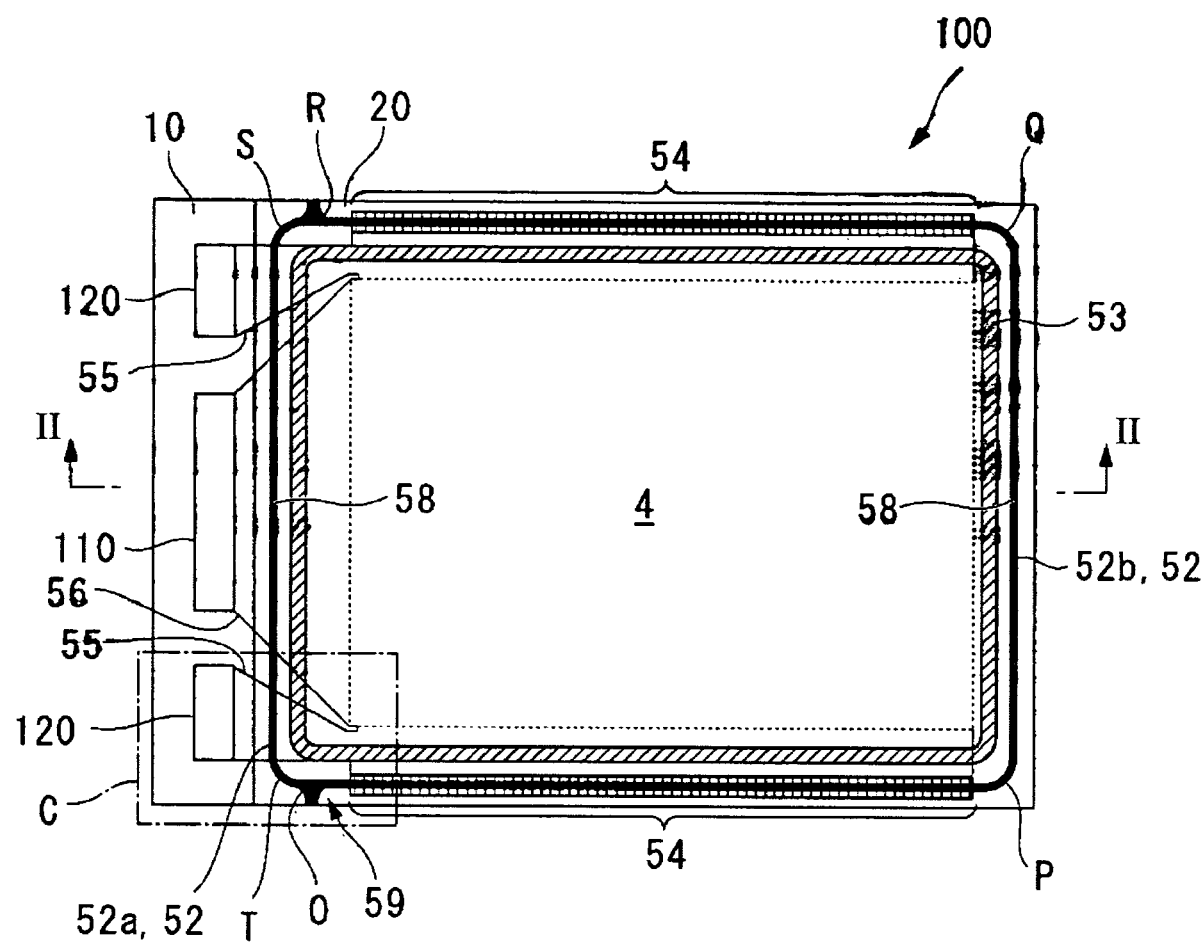
FIG. 1 is a plan view illustrating a liquid crystal display device according to a first embodiment of the invention.

Hereinafter, a liquid crystal display device, a manufacturing method of a liquid crystal display device, and an electronic apparatus according to the invention will be described with reference to the accompanying drawings. In the drawings, a scale of each layer or member is adjusted in order to have a recognizable size.

First Embodiment of a Liquid Crystal Display Device

A first embodiment of a liquid crystal display device according to the invention will be described below.

The following liquid crystal display device of this embodiment is an example of an active matrix transmissive liquid crystal display device which uses thin film diodes (hereinafter, referred to as TFDs) as switching elements to perform transmissive display.

Figure 2:
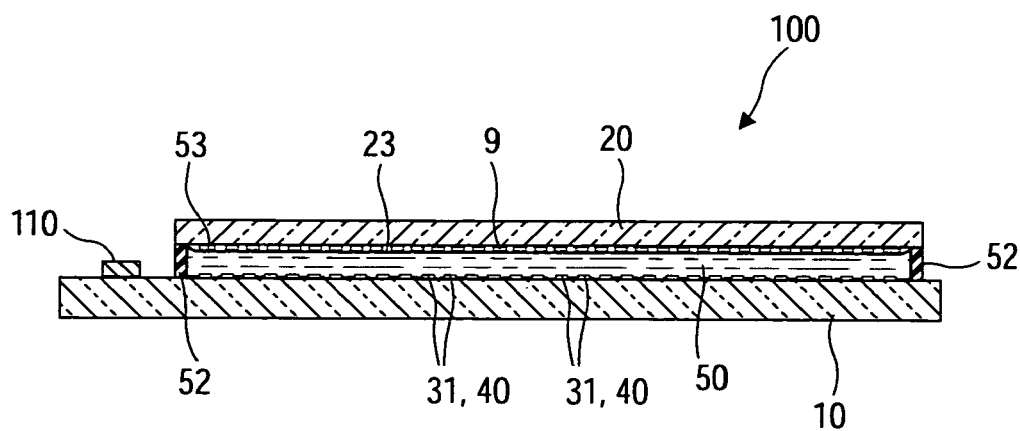
FIG. 2 is a cross-sectional view of the liquid crystal display device according to the first embodiment of the invention, taken along the line II-II of FIG. 1.
Figure 3:
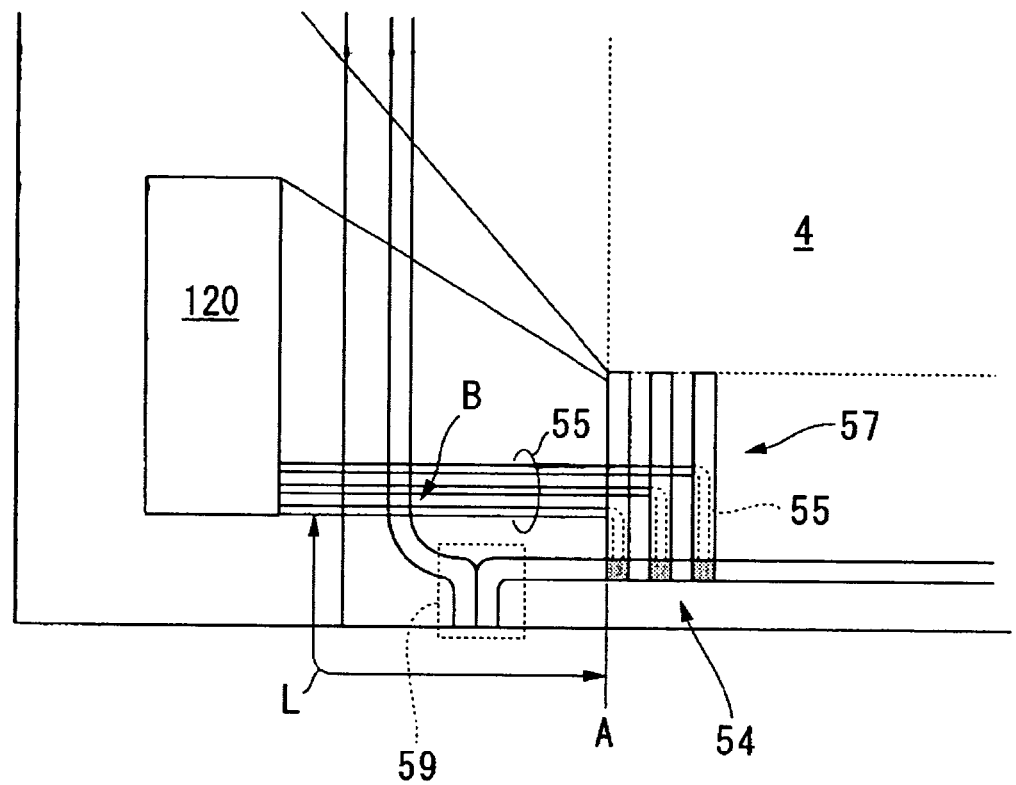
FIG. 3 is a plan view illustrating the main parts of the liquid crystal display device according to the first embodiment of the invention.
Figure 4:
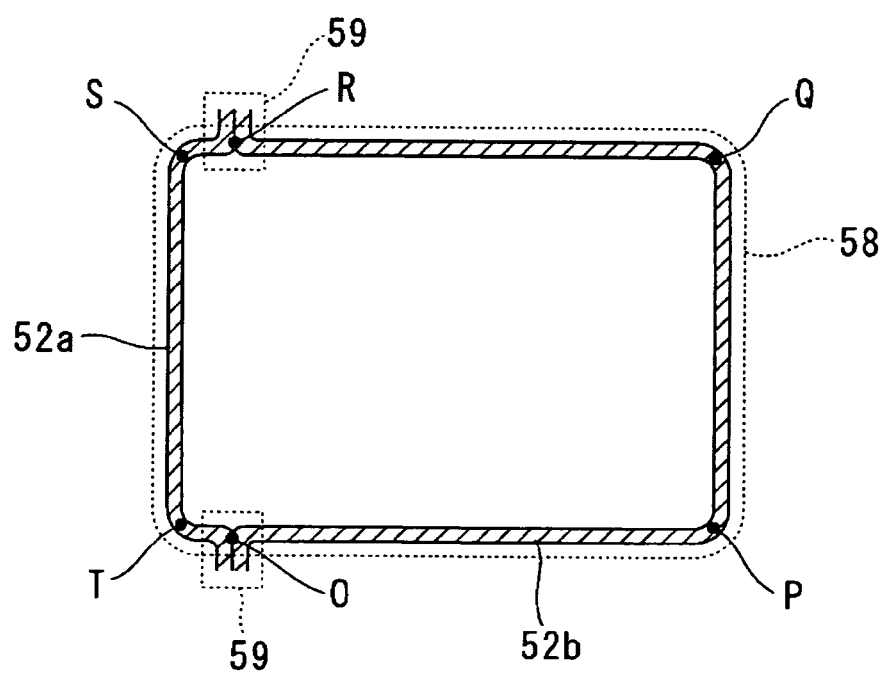
FIG. 4 is a plan view illustrating the main parts of the liquid crystal display device according to the first embodiment of the invention.
Figure 5:
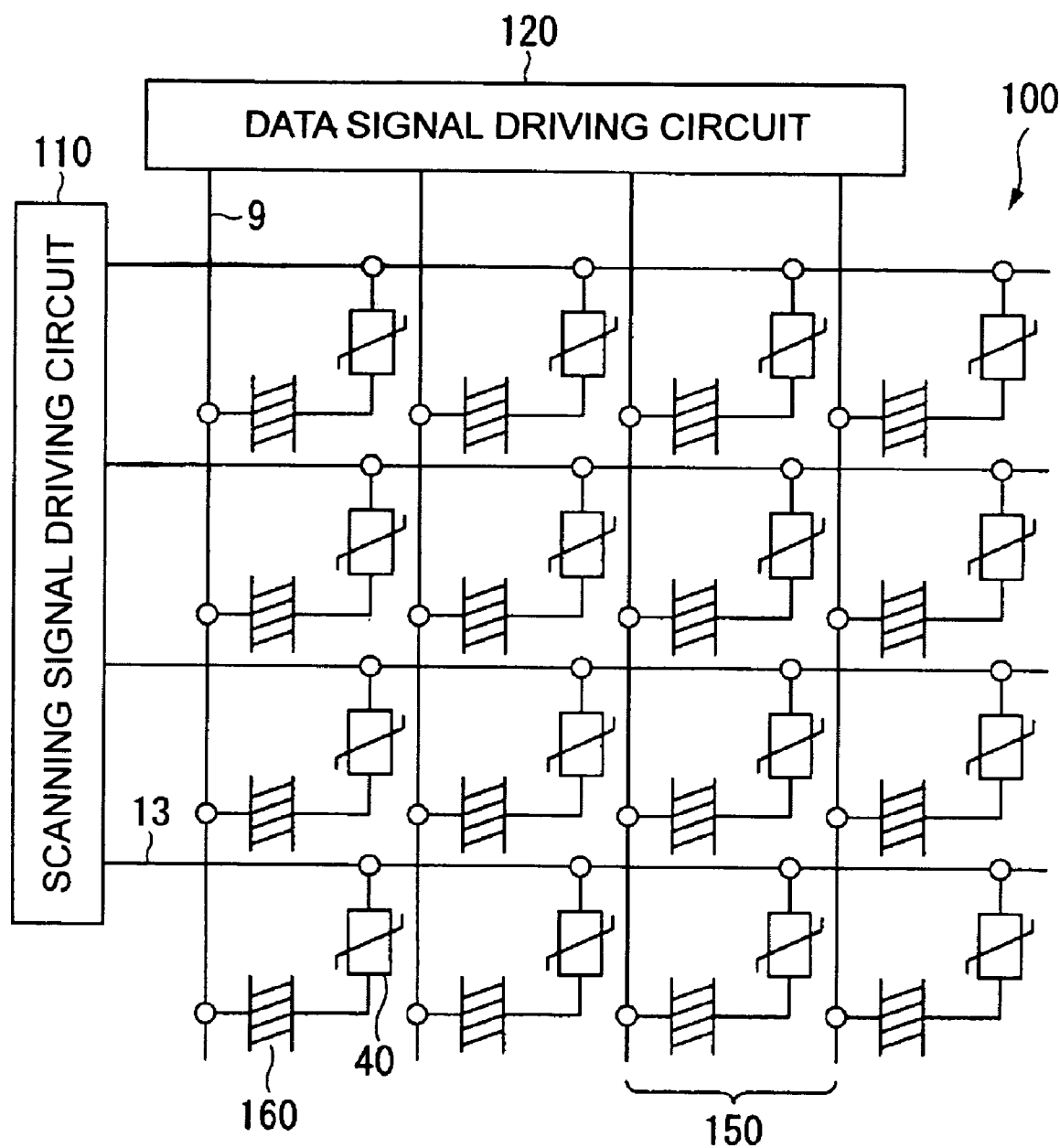
FIG. 5 is an equivalent circuit diagram illustrating the liquid crystal display device according to the first embodiment of the invention.
Figure 6:
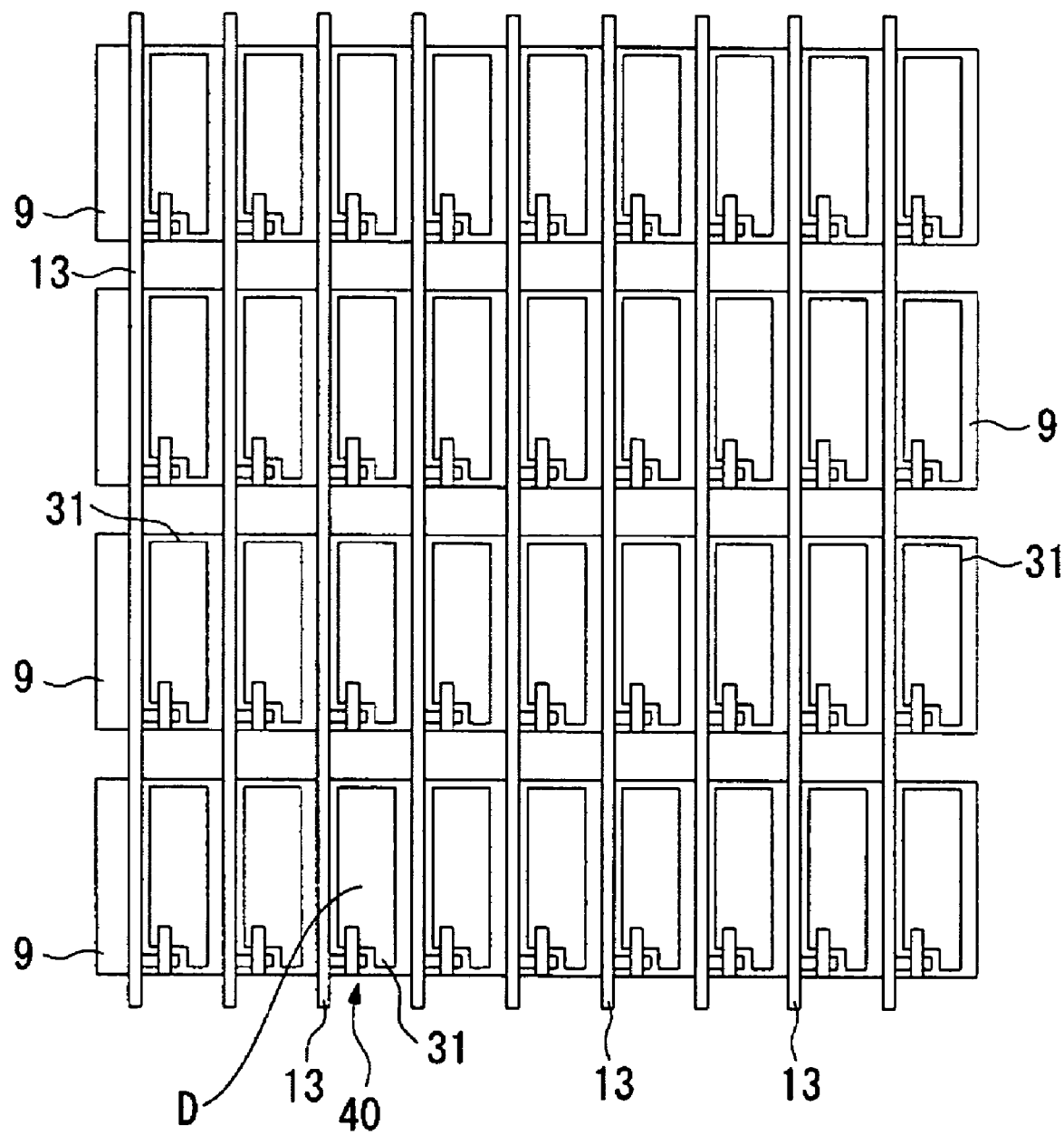
FIG. 6 is a plan view illustrating various components of the liquid crystal display device according to the first embodiment of the invention.

FIG. 1 is a plan view of the liquid crystal display device according to this embodiment, when viewing components thereof from a counter substrate. FIG. 2 is a cross-sectional view taken along the line II-II of FIG. 1. FIG. 3 is an enlarged plan view of a region C shown in FIG. 1. FIG. 4 is a plan view illustrating the structure of a sealing member. FIG. 5 is an equivalent circuit diagram of various elements and wiring lines of a plurality of pixels which are arranged in a matrix in an image display region 4 of the liquid crystal display device. FIG. 6 is a diagram illustrating the plan-view structure of electrodes of various elements (the structure of pixels).

As shown in FIGS. 1 to 3, a liquid crystal display device 100 of this embodiment includes a TFD substrate (first substrate) 10, a counter substrate (second substrate) 20, a sealing member 52, and a liquid crystal layer 50 as main components. In addition, the sealing member 52 is formed on edge portions of the TFD substrate 10 and the counter substrate 20 so as to be interposed therebetween. The liquid crystal layer 50 is arranged on the inner side of the sealing member 52 between the TFD substrate 10 and the counter substrate 20.

Next, each component will be described.

The TFD substrate 10 includes a transparent member, such as a glass substrate, and has an image display region 4, the sealing member 52, a peripheral parting member 53, connection pads (a first connection portion, an electrical connection region) 54, and a scanning signal driving circuit 110, and data signal driving circuits 120 formed thereon.

A plurality of dots is formed in a matrix in the image display region 4, and each dot is provided with a pixel electrode 31 and a TFD element 40. The pixel electrode 31 includes a transparent electrode formed of ITO (indium tin oxide), which is a main ingredient. The TFD element 40 is connected to the scanning signal driving circuit 110 through an SEG electrode 56, and a driving signal is supplied from the scanning signal driving circuit 110 to the pixel electrode 31 as potential. An alignment film formed by performing a rubbing process on a film formed of, for example, polyimide is formed on the pixel electrodes 31 to align liquid crystal molecules of the liquid crystal layer 50 to which a voltage is not applied in the rubbing direction. The peripheral parting member 53 is formed of a light-shielding material, and is formed between the image display region 4 and the sealing member 52. Each connection pad 54 is connected to the data signal driving circuit 120 through extending lines 55 shown in FIG. 3, and is electrically connected to a COM electrode (a second connection portion, a connection region) 57 formed on the counter electrode 20, which will be described later. The scanning signal driving circuit 110 and the data signal driving circuits 120 are formed along one side (the left side of the drawing) of the TFD substrate 10. The SEG electrodes 56 extending from the scanning signal driving circuit 110 overlap the sealing member 52 (52a) between the scanning signal driving circuit 110 and the image display region 4. In addition, extending lines 55 extending from the data signal driving circuits 120 overlap the sealing member 52 (52a) between the data signal driving circuits 120 and the connection pads 54.

FIG. 3 shows only a portion of each of the extending lines 55, the connection pads 54, and the COM electrodes 57. However, actually, the number of extending lines 55 is equal to the number of terminals of the data signal driving circuits 120, and a plurality of connection pads 54 and a plurality of common electrodes 57 are formed to extend in the horizontal direction of the plane of FIG. 1.

The counter substrate 20 has a light shielding film 23, called a black matrix or a black stripe, in regions opposite to boundaries between the pixel electrodes 9 on the TFD substrate 10, and pixel electrodes 9 composed of an ITO film are formed on the light shielding film 23. An alignment film formed by performing a rubbing process on a film formed of, for example, polyimide is formed on the pixel electrodes 9. In addition, as shown in FIG. 3, the COM electrodes 57 are formed at positions where the pixel electrodes 9 extend, outboard of the image display region 4. The COM electrodes 57 are formed opposite to the connection pad 54 with the sealing member 52b (which will be described later) containing conductive particles therein interposed therebetween. Therefore, driving signals from the data signal driving circuit 120 are supplied to the pixel electrodes 9 as potential via the extending lines 55, the connection pad 54, the conductive particles, and the COM electrodes 57.

The sealing member 52 includes an insulating sealing member (a second sealing member) 52a and a conductive sealing member (a first sealing member) 52b.

The insulating sealing member 52a is a sealing member having an electric insulating property, and the conductive sealing member 52b is a sealing member having conductivity. The insulating sealing member 52a is formed in non-conductive regions of the extending lines 55 and the SEG electrodes 56 to electrically separate the extending lines 55 or the SEG electrodes 56. Meanwhile, the conductive sealing member 52b is formed on conductive regions of the connection pad 54 and the COM electrodes 57 to electrically connect the connection pad 54 and the COM electrodes 57.

Further, conductive particles are included in the conductive sealing member 52b, but the conductive particles are not included in the insulating sealing member 52a. The conductive particles include conductive metal particles and particles whose resin surfaces are coated with a conductive material. The conductive particles have elasticity. Therefore, when the TFD substrate 10 and the counter substrate 20 are bonded to each other, the connection pads 54 and the COM electrodes 57 press against the conductive particles, and the connection pads 54 are electrically connected to the COM electrodes 57 by the elasticity.

Furthermore, both the insulating sealing member 52a and the conductive sealing member 52b are formed of a thermosetting or ultraviolet-curable resin material or a resin material having both a thermosetting characteristic and an ultraviolet-curable characteristic according to a hardening process. In this embodiment, World Rock No. 717 (made by Kyoritsu Chemical & Co., Ltd.) is used as the sealing member 52. The material has a viscosity of 400,000 mPa·s, and the thickness of the sealing member 52 after bonding is 8 μm.

The insulating sealing member 52a and the conductive sealing member 52b are formed in a pattern shown in FIG. 4, so that a ring-shaped portion 58 having the liquid crystal layer 50 maintained inboard thereof and connecting portions 59 of the insulating sealing member 52a and the conductive sealing member 52b are formed. This pattern causes the sealing member 52 to be formed in a closed frame shape on the surface of the TFD substrate 10, and thus the sealing member 52 is not provided with an inlet for injecting liquid crystal. In addition, after a sealing material 52 is discharged from a dispenser, which will be described later, onto the TFD substrate 10 or the counter substrate 20, the sealing material is pressed by the TFD substrate 10 and the counter substrate 20. In this way, the sealing member 52 maintains a predetermined cell gap.

In the ring-shaped portion 58, the insulating sealing member 52a is formed so as to pass through points R, S, T, and O in FIG. 4, and the conductive sealing member 52b is formed so as to pass through points O, P, Q, and R in FIG. 4.

In the connecting portions 59, the insulating sealing member 52a and the conductive sealing member 52b are connected to each other at the points O and R. Therefore, the connecting portions 59 are formed at one point on one side TP of the ring-shaped portion and at one point on the side SQ thereof. That is, the connecting portions 59 are formed on the sides of the ring-shaped portion 58 opposite to each other. In this embodiment, the insulating sealing member 52a is connected to the conductive sealing member 52b so as to be adjacent to each other, but it may be connected to the conductive sealing member so as to overlap each other.

Further, the connecting portions 59 are formed to extend from the ring-shaped portion 58, and the ring-shaped portion 59 is closed up at the points O and R. This structure makes it possible to prevent the liquid crystal layer 50 maintained inside the ring-shaped portion 58 from leaking to the outside of the sealing member 52. A part of each of the connecting portions 59 is incorporated into the ring-shaped portion 58 at the point O or R, and the other parts of the connecting portions 59 are formed outboard of the ring-shaped portion 58. In order words, the connecting portions 59 are formed to extend from the closed portions (the points O and R) of the ring-shaped portion 58 to the outside of the ring-shaped portion 58. Therefore, the connecting portions 59 do not overlap the ring-shaped portion 58, but only a part of each of the connecting portions 59 connects the sealing members 52a and 52b. In addition, the other parts of the connecting portions 59 are formed to extend to the outside of the ring-shaped portion 58.

Furthermore, as shown in FIG. 3, the connecting portion 59 is formed at a central portion between an end of the connection pad 54 (which is denoted by a character 'A') and an end portion (which is denoted by a character 'B') where the extending line 55 intersects the sealing member 52, that is, at the center of a portion denoted by a character 'L'. In the liquid crystal display device 100 of this embodiment, the length of the portion L is set to be smaller than 2 mm.

The first and second regions of the sealing member 52 are connected to each other by the connecting portions 59, thereby forming the ring-shaped portion 58, as will be described later.

The liquid crystal layer 50 is positioned inboard of the ring-shaped portion 58. The liquid crystal layer 50 is formed by, for example, an inkjet method (a liquid discharging method) or a dispenser method. In addition, the thickness of the liquid crystal layer 50 is connected with the thickness of the sealing member 52 and is set to have a predetermined cell gap. A material forming the liquid crystal layer 50 is properly selected according to the operation mode of the liquid crystal display device 100, such as a TN (twisted nematic) mode or an STN (supper twisted nematic) mode, and the display mode thereof, such as a normally white mode or a normally black mode.

Next, the image display region 4 of the liquid crystal display device 100 will be described in detail.

As shown in the equivalent circuit diagram of FIG. 5, the liquid crystal display device 100 is provided with a plurality of scanning lines 13 and a plurality of data lines (pixel electrodes) 9 intersecting the scanning lines 13. The scanning lines 13 are driven by the scanning signal driving circuit 110, and the data lines 9 are driven by the data signal driving circuits 120. The scanning lines 13 are connected to the SEG electrodes 56 outboard of the image display region 4. In each pixel region 150, the TFD element 40 is connected in series to a liquid crystal display element 160 (the liquid crystal layer 50) between the scanning line 13 and the data line 9. In FIG. 5, the TFD elements 40 are connected to the scanning lines 13, and the liquid crystal display elements 160 are connected to the data lines 9. In contrast, the TFD elements 40 may be connected to the data lines 9, and the liquid crystal display elements 160 may be connected to the scanning lines 13.

As shown in the plan-view structure of electrodes of FIG. 6, in the liquid crystal display device 100, pixel electrodes 31 having rectangular shapes in plan view are connected to the scanning lines 13 through the TFD elements 40 and are provided in a matrix. The pixel electrodes 9 are provided in strip shapes so as to be opposite to the pixel electrodes 31 in a direction perpendicular to the plane of FIG. 6. The pixel electrodes 9 are composed of the data lines and have strip shapes intersecting the scanning lines 13. In this embodiment, each region having one pixel electrode 31 therein serves as one dot region, and the dot regions arranged in a matrix are provided with the TFD elements 40, thereby performing display in each dot region.

The TFD element 40 is a switching element that connects the scanning line 13 and the pixel electrode 31, and has an MIM structure including a first conductive film containing Ta as the main ingredient, an insulating film which is formed on the first conductive film and contains $Ta_2O_3$ as the main ingredient, and a second conductive film which is formed on the insulating film and contains Cr as the main ingredient. The first conductive film of the TFD element 40 is connected to the scanning line 13, and the second conductive film thereof is connected to the pixel electrode 31.

Instead of the structure in which the scanning signal driving circuit 110 and the data signal driving circuits 120 are formed on the TFD substrate 10, a TAB (tape automated bonding) substrate having a driving LSI mounted thereon may be electrically and mechanically connected to a group of terminals formed on a peripheral portion of the TFD substrate 10 through an anisotropic conductive film. In the liquid crystal display device 100, retardation plates and polarizing plates are arranged in a predetermined direction according to the type of the liquid crystal layer 50, that is, operational modes, such as a TN (twisted nematic) mode and an STN (supper twisted nematic) mode, or display modes, such as a normally white mode and a normally black mode. However, in this embodiment, these components are not shown. When the liquid crystal display device 100 includes a color display type, R (red), G (green), and B (blue) color filters and a protective film for protecting these color filters are formed in regions of the counter substrate 20 opposite to pixel electrodes (which will be described later) of the TFD substrate 10.

Manufacturing Method of the Liquid Crystal Display Device

Next, a manufacturing method of the liquid crystal display device will be described.

First, (1) a schematic description of a manufacturing method of a liquid crystal display device, (2) a description of a device manufacturing apparatus, and (3) a detailed description of the manufacturing method of a liquid crystal display device will be sequentially made below.

Figure 7A:
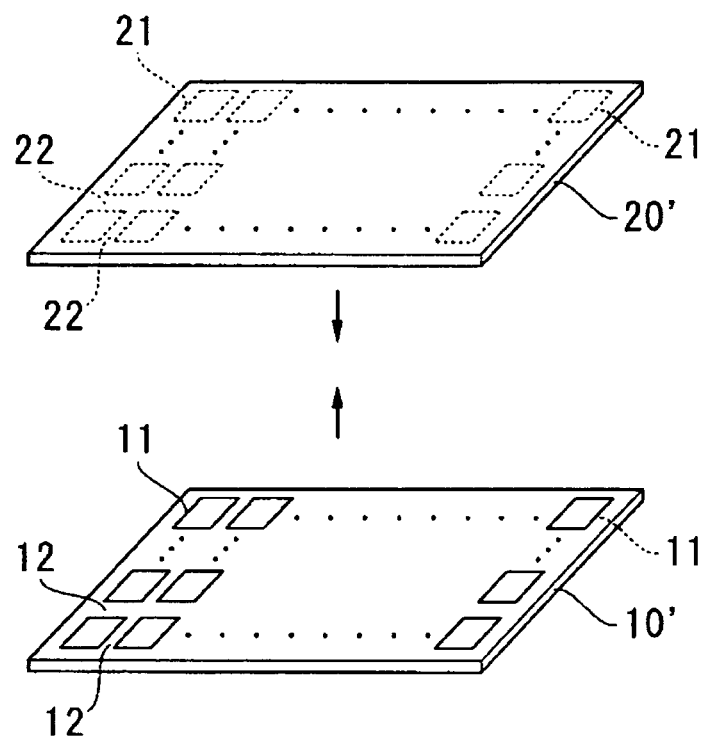
FIGS. 7A to 7C are diagrams schematically illustrating a manufacturing method of the liquid crystal display device according to the invention.
Figure 7B:
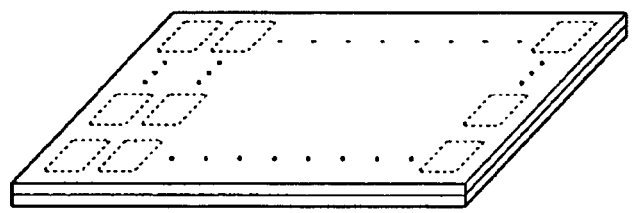
Figure 7C:
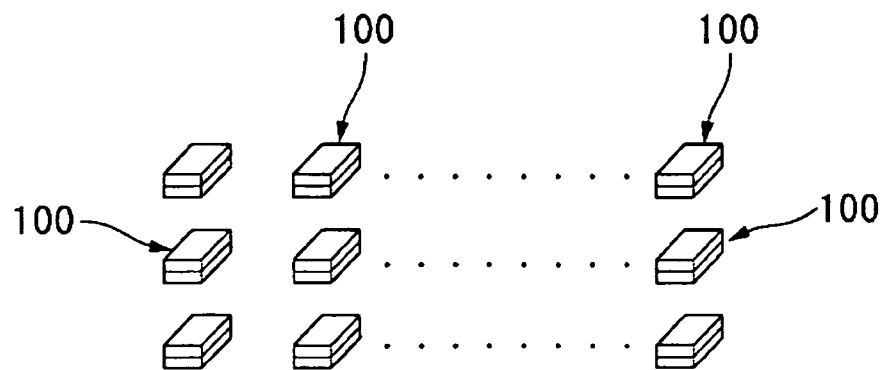

(1) Schematic Description of Manufacturing Method of the Liquid Crystal Display Device FIGS. 7A to 7C are diagrams schematically illustrating a manufacturing method of a liquid crystal display device.

As shown in FIG. 7A, a mother board (a first base member) 10' for a TFD substrate and a mother board (a second base member) 20' for a counter substrate are prepared.

A plurality of TFD forming regions (first element regions) 11 are partitioned on the mother board (the first base member) 10' for a TFD substrate. The surroundings of the partitioned TFD forming regions 11 serve as mutual boundary portions 12. Then, semiconductor manufacturing processes including a well-known photolithography technique are performed on the mother board 10' for a TFD substrate to form the TFD elements 40, the pixel electrodes 31, the connection pads 54, the extending lines 55, the SEG electrodes 56, and an alignment film in the TFD forming regions 11. In addition, the scanning signal driving circuits 110 and the data signal driving circuits 120 are simultaneously incorporated into the TFD forming regions 11.

Meanwhile, a plurality of counter electrode forming regions (second element regions) 21 are partitioned on the mother board (the first base member) 20' for a counter substrate. The surroundings of the partitioned counter electrode forming regions 21 serve as mutual boundary portions 22. Then, semiconductor manufacturing processes including a well-known photolithography technique are performed on the mother board 20' for a counter substrate to form the pixel electrodes 9, the COM electrodes 57, and an alignment film in the counter electrode forming regions 21.

Here, the number of TFD forming regions 11 is equal to the number of counter electrode forming regions 21. In addition, when the mother board 10' for a TFD substrate and the mother board 20' for a counter substrate are bonded to each other, the regions 11 and 21 are aligned with each other with high accuracy in position.

Next, the mother board 10' for a TFD substrate and the mother board 20' for a counter substrate are bonded to each other, as shown in FIG. 7B. Specifically, the mother board 10' for a TFD substrate and the mother board 20' for a counter substrate are bonded to each other, with the liquid crystal layer 50 and the sealing member 52, which will be described later, interposed therebetween.

Subsequently, as shown in FIG. 7C, in a state in which the mother boards 10' and 20' are bonded to each other, a cutting process is performed thereon along the mutual boundary portions 12 and 22, thereby forming a plurality of liquid crystal display devices 100.

(2) Device Manufacturing Apparatus

Next, a device manufacturing apparatus that performs a process for forming the sealing member 52, a process for discharging a liquid material to form the liquid crystal layer 50, a bonding process, and a process for hardening the sealing member 52 in the manufacture of the liquid crystal display device 100 will be described.

Figure 8:
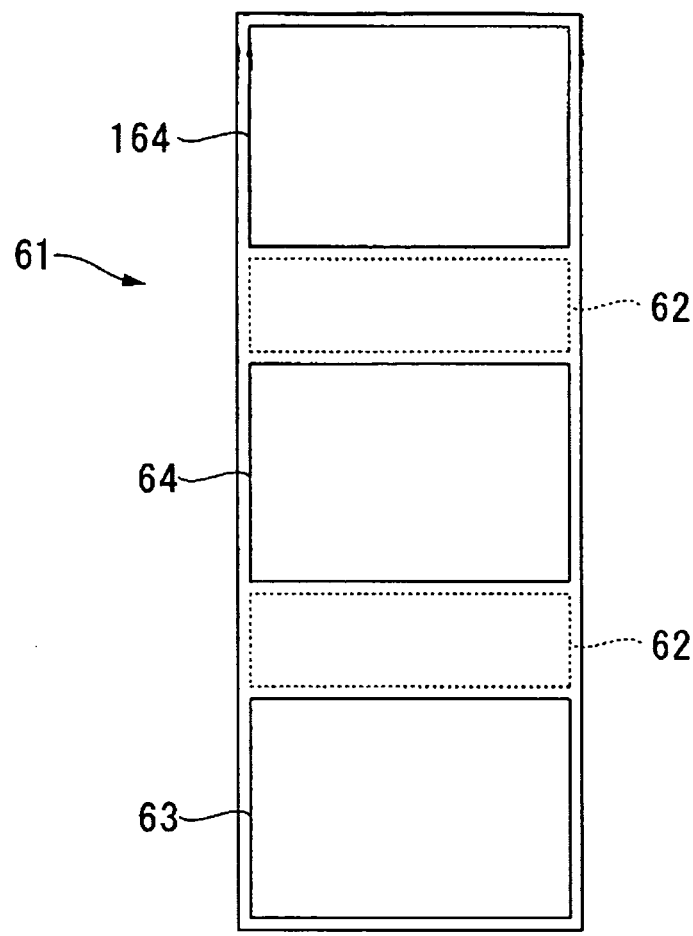
FIG. 8 is a diagram illustrating the structure of a device manufacturing apparatus used for the manufacturing method of the liquid crystal display device according to the invention.

FIG. 8 is a diagram schematically illustrating the structure of a device manufacturing apparatus 61.

As shown in FIG. 8, the device manufacturing apparatus 61 includes substrate feeding/removing units 62 for feeding/removing a substrate, a material supplying unit 63, a substrate bonding unit 64, and an accurate alignment unit 164 as main components.

Figure 9:
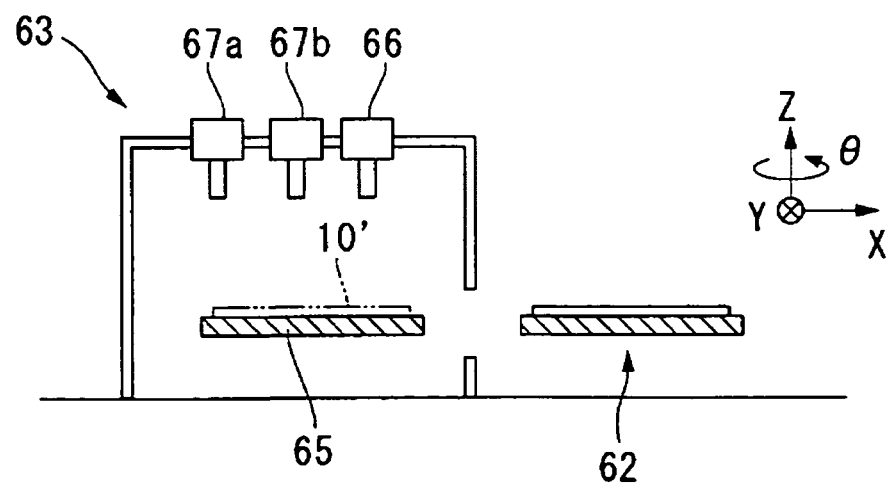
FIG. 9 is a diagram illustrating the structure of a substrate feeding/removing unit and a material supplying unit used for the manufacturing method of the liquid crystal display device according to the invention.

FIG. 9 is a diagram schematically illustrating the substrate feeding/removing unit 62 and the material supplying unit 63. In the following description, the horizontal direction and the vertical direction of the substrate in plan view are referred to as an X direction (for example, the horizontal direction of FIG. 9) and a Y direction (for example, the vertical direction to the plane of FIG. 9), respectively, and a direction perpendicular to the XY plane is referred to as a Z direction.

As shown in FIG. 9, the material supplying unit 63 includes a table 65 which moves to the X direction, the Y direction, and a θ direction (a rotational direction on an axis parallel to the Z direction) with a substrate placed thereon, a liquid discharging head 65 which is provided above the table 65 to discharge a liquid crystal material (an electro-optical material), and sealing material applying units 67a and 67b which are provided around the liquid discharging head 66 to apply a sealing material.

The sealing material applied from the sealing material applying units 67a and 67b contains a substantially spherical gap control material, and the gap control material has a diameter (for example, a diameter of about 8 μm) capable of maintaining a predetermined thickness (for example, 3 μm) between the substrates. The diameter (about 8 μm) of the gap control material is set in order to maintain the thickness (about 5 μm) of a color filter in the display region and the cell gap (3 μm).

In addition, the sealing material applying unit 67a functions to apply the insulating sealing member 52a, and the sealing material applying unit 67b functions to apply the conductive sealing member 52b.

Further, any devices, such as a chemical discharging machine (a measuring-type dispenser), other than the liquid discharging head 66 may be used to discharge a liquid crystal material as long as they can control the amount of a liquid crystal material to be discharged. Further, the gap control material has a substantially spherical shape. In addition to the gap control material contained in the sealing member, the following gap control materials can be used: a gap control material that is formed in a fiber shape and is contained in a sealing member; and a gap control material which is formed in a pillar shape protruding from a substrate without being contained in a sealing member. It is preferable to use a gap control material which is fixed at a predetermined position on a substrate so as not to move on the substrate when the substrates are bonded to each other.

The substrate feeding/removing unit 62 includes a carrier for carrying substrates between the material supplying unit 63 and the substrate bonding unit 64 and between the substrate bonding unit 64 and the accurate alignment unit 164.

The substrate feeding/removing unit 62 may have a structure including a carrying robot or a unit that has a carrying function for connecting the material supplying unit 63, the substrate bonding unit 64, and the accurate alignment unit 164, instead of the structure shown in FIG. 9.

Figure 10:
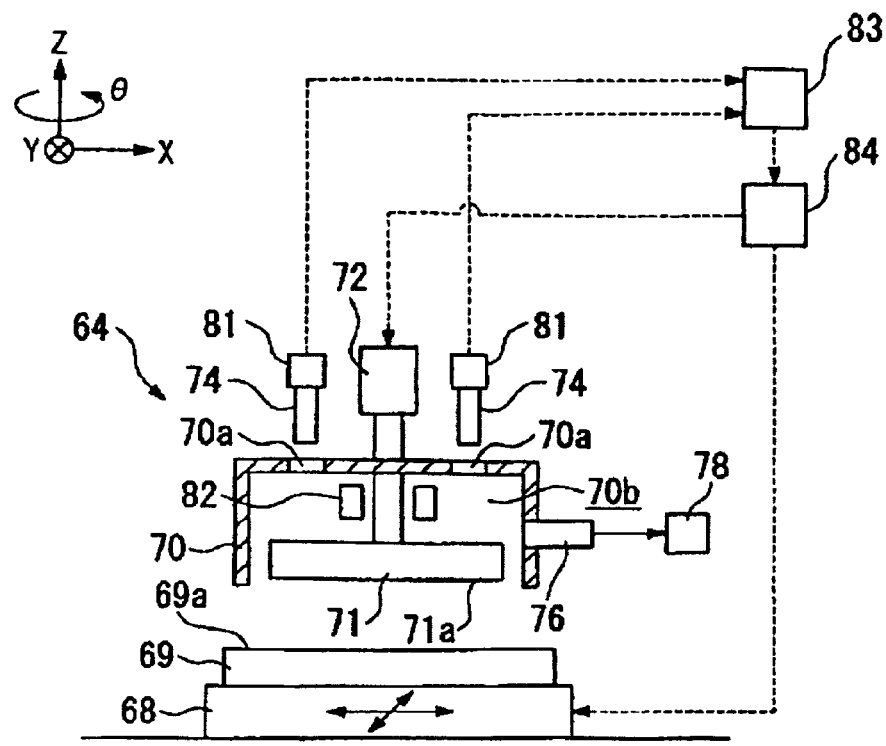
FIG. 10 is a diagram illustrating the structure of a substrate bonding unit used for the manufacturing method of the liquid crystal display device according to the invention.

FIG. 10 is a diagram schematically illustrating the structure of the substrate bonding unit 64.

As shown in FIG. 10, the substrate bonding unit 64 includes a table 68 that moves to the X direction, the Y direction, and the θ direction with a substrate placed thereon, a lower chuck portion 69 that is provided on the table 68, a vacuum chamber 70 that is provided above the lower chuck portion 69, an upper chuck portion 71 that is provided in the vacuum chamber 70 so as to be opposite to the lower chuck portion 69, and a lowering mechanism 72 that supports the upper chuck portion 71 to be moved in the Z direction and presses it against the lower chuck portion 69.

Inspection windows 70a and an exhaust portion 76 are provided in wall surfaces of the vacuum chamber 70. Optical measuring units each including a bonding microscope 74 for magnifying alignment marks on a substrate so as for an operator to observe it through the inspection window 70a and a CCD camera 81 for capturing images of the magnified alignment marks are provided above the inspection windows 70a. The exhaust portion 76 is connected to an absorbing apparatus 78 including, for example, a vacuum pump for exhausting (de-aerating) air from an accommodation space 70b.

Further, the vacuum chamber 70 is provided a UV radiating unit 82. The UV radiating unit 82 is provided with a UV lamp, such as a mercury lamp for radiating ultraviolet rays to temporarily harden the sealing member 52 and, if necessary, an optical guide such as a fiber.

The UV radiation unit 82 preferably supplies energy sufficient for raising the viscosity of the sealing member 52. In addition to the UV lamp, various apparatuses, such as a heating/cooling apparatus and a visible ray radiating apparatus can be used to supply energy to the sealing member 52 according to the property of the sealing member 52.

The substrate bonding unit 64 is provided with an image processing unit 83 for processing the images captured by the CCD camera 81 and a control unit 84 for controlling the table 68 and the lowering mechanism 72 on the basis of image information obtained by the image processing unit 83.

The lower chuck portion 69 and the upper chuck portion 71 are provided with holding mechanisms (not shown) for holding substrates on holding surfaces 69a and 71a thereof opposite to each other, respectively.

In addition, any mechanisms capable of holding a substrate under a substantially vacuum atmosphere, such as a chuck structure using static electricity or adhesion and a mechanical holding structure for mechanically holding a substrate, can be provided in the lower chuck portion 69 and the upper chuck portion 71. Alternatively, holding methods using, for example, adhesion, molecular force, vacuum, and mechanical force may be used.

Figure 11:
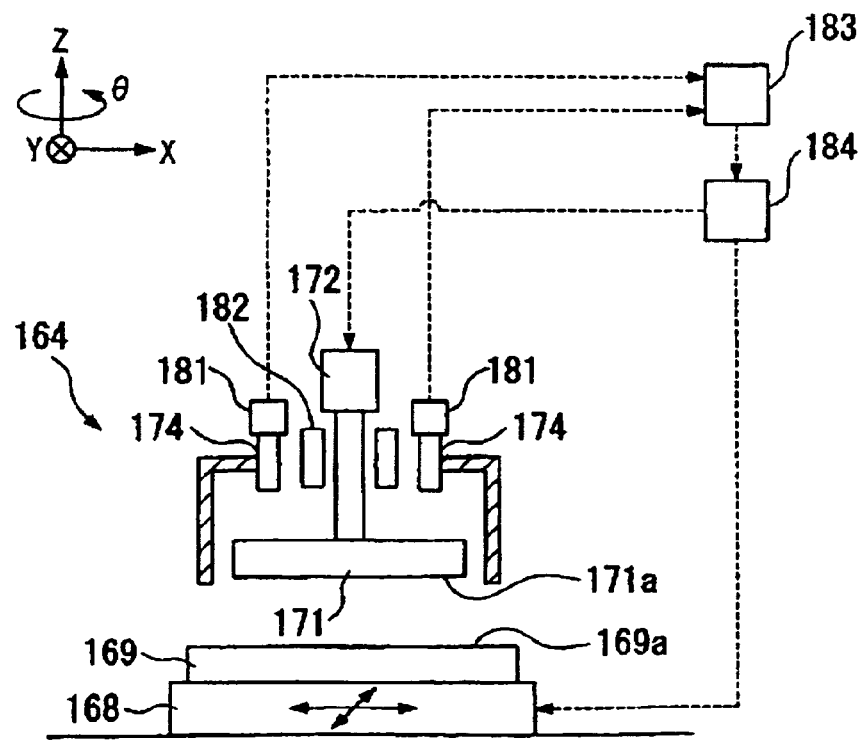
FIG. 11 is a diagram illustrating the structure of an accurate alignment unit used for the manufacturing method of the liquid crystal display device according to the invention.

FIG. 11 is a diagram schematically illustrating the structure of the accurate alignment unit 164.

The accurate alignment unit 164 includes a table 168 that moves to the X direction, the Y direction, and the θ direction with a substrate placed thereon, a lower chuck portion 169 that is provided on the table 168, an upper chuck portion 171 that is provided so as to be opposite to the lower chuck portion 169, a pressing mechanism 172 that supports the upper chuck portion 171 to be moved in the Z direction and presses it against the lower chuck portion 169, alignment microscopes 174 for magnifying alignment marks on a substrate, and a UV lamp 182, such as a mercury lamp for radiating ultraviolet rays to harden the sealing member 52. Optical measuring units each include the alignment microscope 174 and a CCD camera 181 for capturing images of the magnified alignment marks.

The accurate alignment unit 164 is provided with an image processing unit 183 for processing the images captured by the CCD camera 181 and a control unit 184 for controlling the table 168 on the basis of image information obtained by the image processing unit 183.

The lower chuck portion 169 and the upper chuck portion 171 are provided with absorbing mechanisms (not shown) for vacuum-absorbing substrates on holding surfaces 169a and 171a thereof opposite to each other, respectively.

In addition, any mechanisms capable of generating a sufficient holding force to move the bonded substrates to the X-axis direction and the Y-axis direction, such as a chuck structure using static electricity or adhesion and a mechanical holding structure for mechanically holding a substrate, can be provided in the lower chuck portion 169 and the upper chuck portion 171.

Further, the accurate alignment unit 164 may be provided with a pressing mechanism 172 that presses the upper chuck portion 171 against the lower chuck portion 169.

Furthermore, in addition to the UV lamp 182, various apparatuses, such as a heating/cooling apparatus and a visible ray radiating apparatus, can be used to harden the sealing member 52 according to the property of the sealing member 52.

Figure 12A:
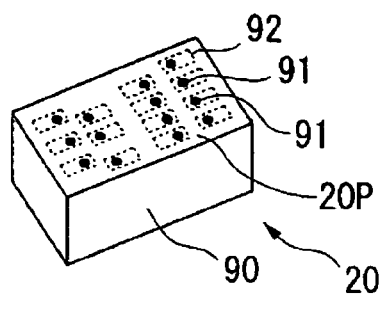
FIGS. 12A and 12B are diagrams illustrating an example of a liquid discharging head used for the manufacturing method of the liquid crystal display device according to the invention.
Figure 12B:
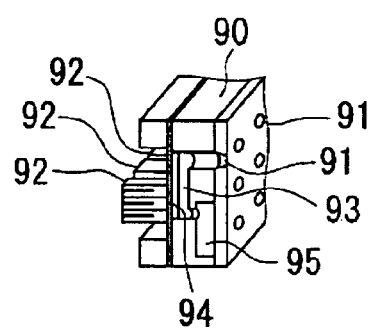

For example, a liquid discharging head shown in FIGS. 12A and 12B can be used as the liquid discharging head 66 shown in FIG. 9. A head body 90 of the liquid discharging head 66 is provided with a reservoir 95 and a plurality of ink rooms (pressure generating rooms) 93. The reservoir 95 includes passages for supplying ink containing an electro-optical material, such as liquid crystal, to the respective ink rooms 93. A nozzle plate constituting an ink discharging surface 66P is mounted on one end surface of the head body 90. A plurality of nozzles 91 for discharging ink are provided in the nozzle plate, corresponding to the ink rooms 93. The passages are respectively formed from the ink rooms 93 to the corresponding nozzles 91. Meanwhile, a vibrating plate 94 is mounted on the other end surface of the head body 90.

The vibrating plate 94 constitutes a wall surface of the ink room 93. Piezo elements (pressure generating units) 92 are provided at the outside of the vibrating plate 94 so as to correspond to the ink rooms 93. The piezo element 92 is formed by interposing a piezoelectric material, such as quartz, between a pair of electrodes (not shown).

Figure 13A:
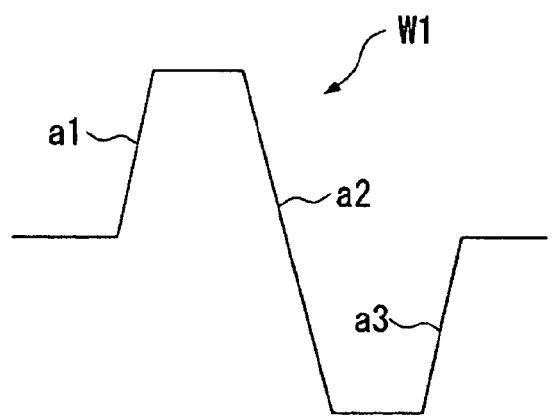
FIG. 13A is a diagram illustrating the waveform of a driving voltage of a piezo element of the liquid discharging head shown in FIGS. 12A and 12B.
Figure 13B:
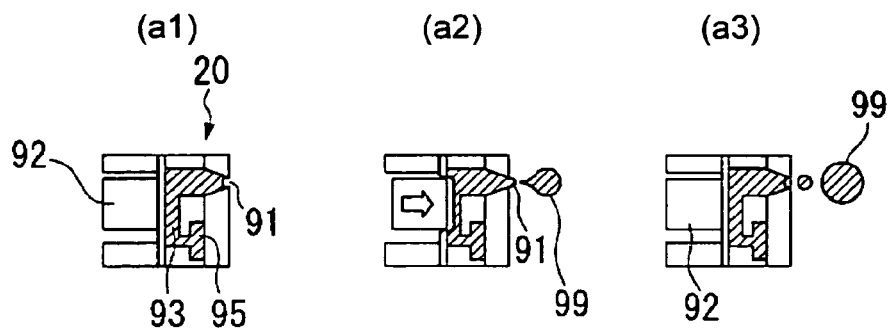
FIG. 13B is a diagram illustrating the operation of the piezo element of the liquid discharging head shown in FIGS. 12A and 12B.

FIG. 13A is a diagram schematically illustrating a waveform W1 of a driving voltage of the piezo element, and FIG. 13B are diagrams illustrating the operation of the liquid discharging head 66 corresponding to the driving voltage. A case in which the driving voltage having the waveform W1 is applied to the pair of electrodes constituting the piezo element 92 will be described below. In positive gradient portions (a1) and (a3), the piezo element 92 contracts to cause the volume of the ink room 93 to be increased, and thus ink flows from the reservoir 95 into the ink room 93. On the other hand, in a negative gradient portion (a2), the piezo element 92 expands to cause the volume of the ink room 93 to be reduced, and thus a pressed ink 99 is discharged from the nozzles 91. In this case, the discharge amount of ink is determined by, for example, the amplitude of the waveform W1 of the driving voltage and the number of applying times of the driving voltage.

A driving method of the liquid discharging head 66 is not limited to the piezo jet type using the piezo elements 92. For example, a thermal inkjet method using thermal expansion may be used as the driving method of the liquid discharging head 66. In addition, the liquid crystal material can be applied by applying apparatuses other than the inkjet head. For example, a dispenser can be used as a liquid crystal applying apparatus other than the inkjet head. Since the dispenser has nozzles whose diameters are larger than those of the nozzles of the inkjet head, the dispenser can discharge liquid crystal with high viscosity.

(3) Detailed Description of Manufacturing Method of the Liquid Crystal Display Device Next, a process for manufacturing the liquid crystal display device 100 using the device manufacturing apparatus 61 will be described with reference to FIGS. 14A to 18C.

In the following description, it is assumed that the pixel electrodes 9 and 31, described with reference to FIG. 7A, have already been formed on the mother board 10' for a TFD substrate and the mother board 20' for a counter substrate, respectively.

Figure 14A:
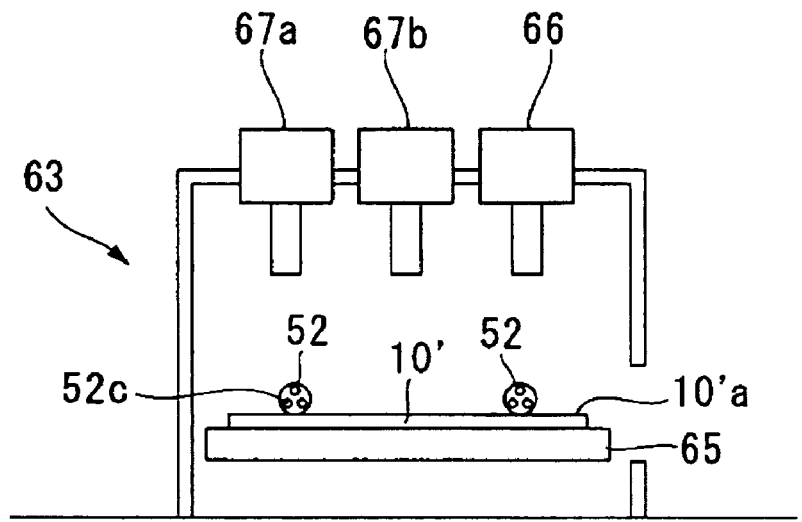
FIGS. 14A to 14C are diagrams illustrating the manufacturing method of the liquid crystal display device according to the invention.

First, as shown in FIG. 14A, the mother board 10' for a TFD substrate having the pixel electrodes 31 formed thereon is carried by the substrate feeding/removing unit 62 to be placed on the table 65 of the material supplying unit 63 with a sealing surface 10'a facing upward. Then, a sealing material is applied from a sealing material applying unit 67a onto the mother board 10' for a TFD substrate while moving the table 65, and the sealing material is applied from a sealing material applying unit 67b, thereby forming the sealing member 52 on the mother board 10' for a TFD substrate (a sealing member forming process). In this case, the sealing member 52 includes the insulating sealing member 52a and the conductive sealing member 52b. The insulating sealing member 52a is applied by the sealing material applying unit 67a, and the conductive sealing member 52b is applied by the sealing material applying unit 67b.

Then, a method of forming the sealing member 52 will be described in detail.

Figure 17A:
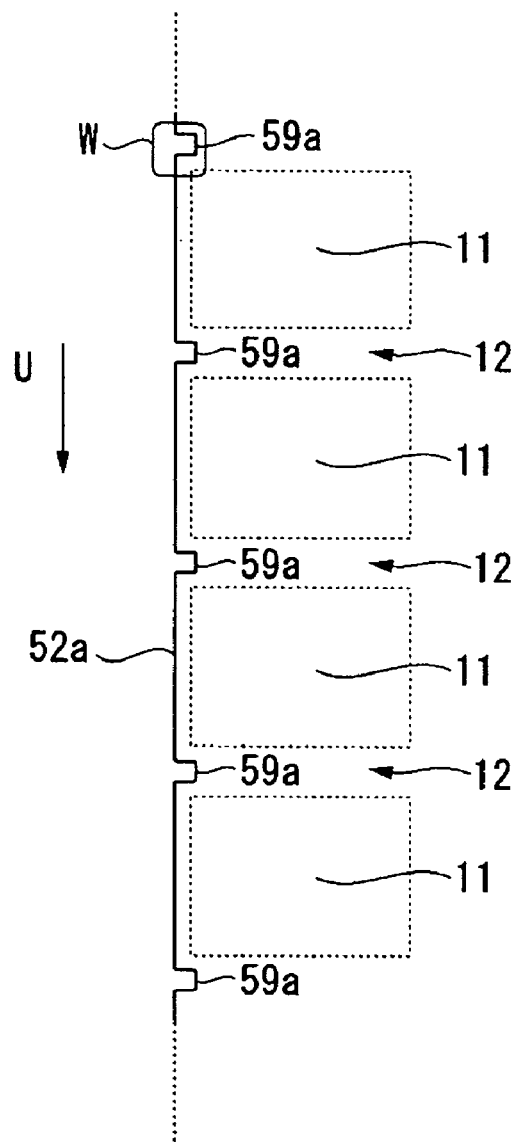
FIGS. 17A and 17B are diagrams illustrating a process for forming a sealing member in the manufacturing method of the liquid crystal display device according to the invention.
Figure 17B:
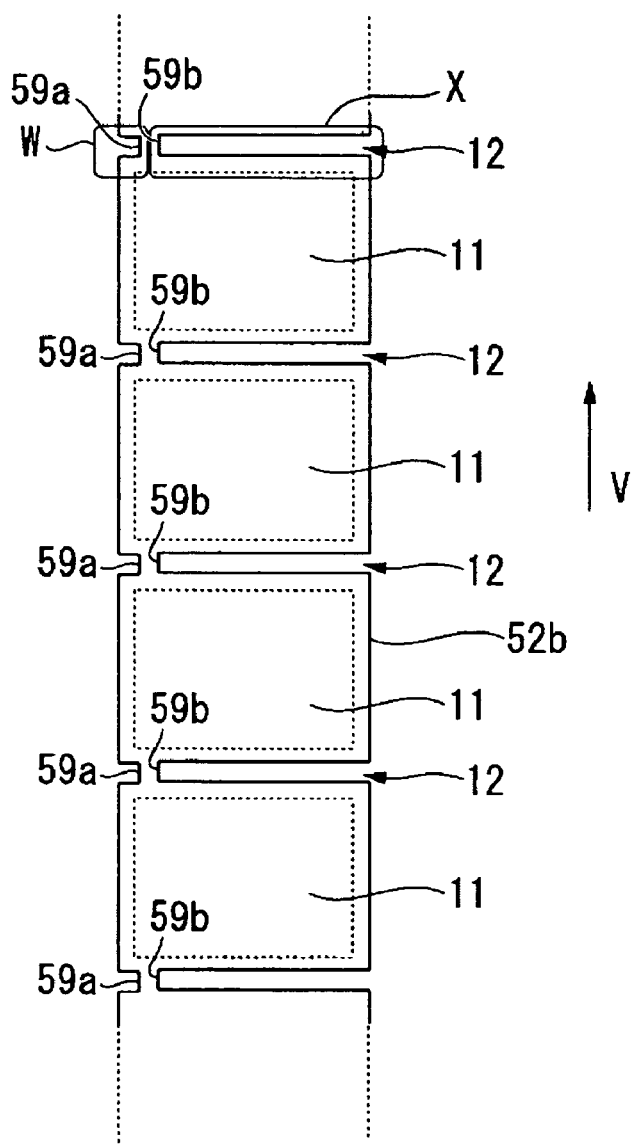
Figure 18A:
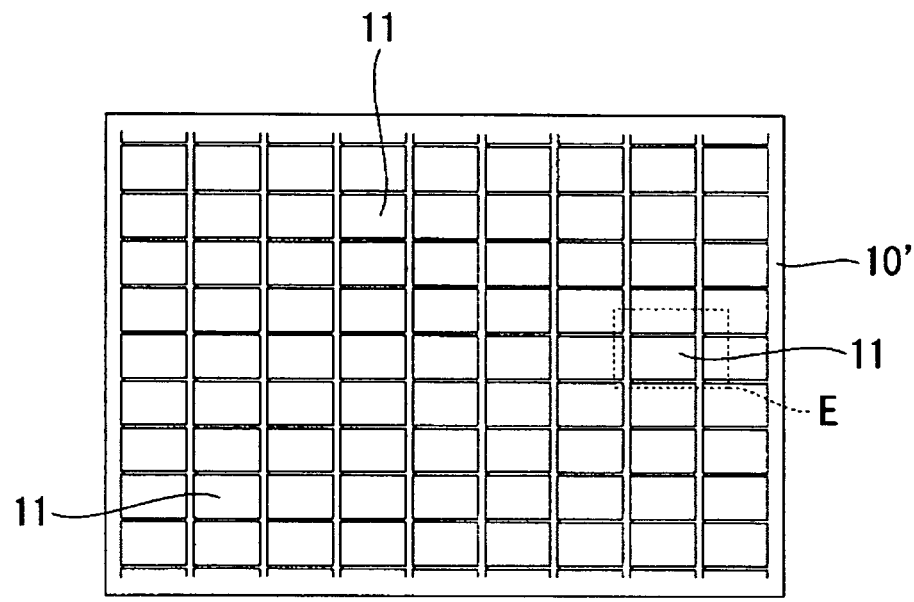
FIGS. 18A to 18C are diagrams illustrating the outward appearance of a mother board in the manufacturing method of the liquid crystal display device according to the invention.
Figure 18B:
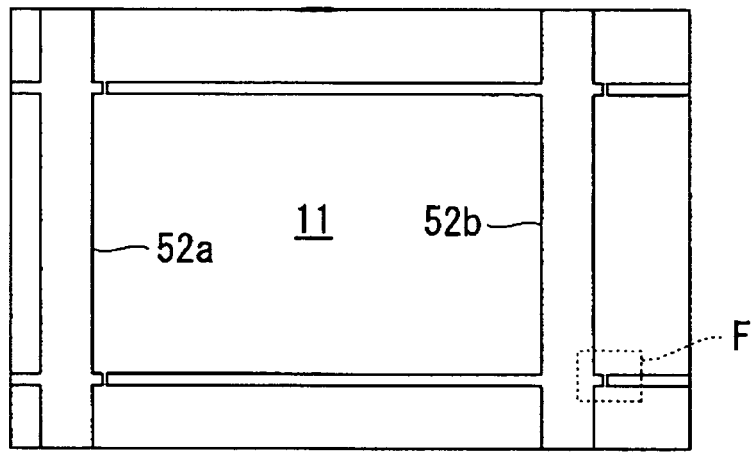
Figure 18C:
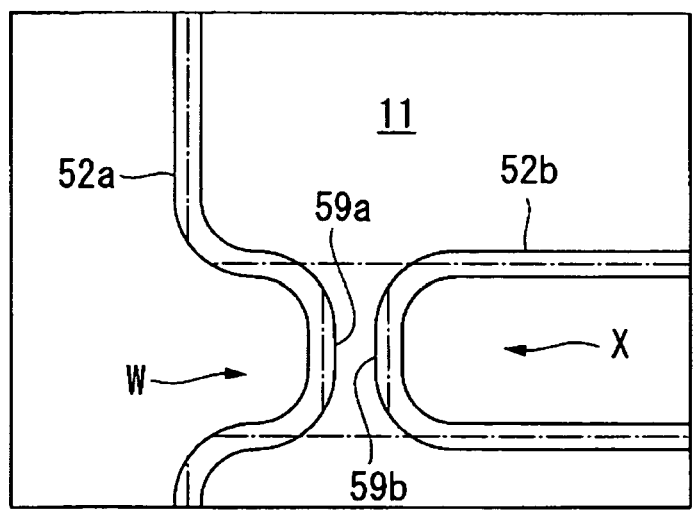

FIGS. 17A and 17B are plan views illustrating the method of forming the sealing member 52. FIGS. 18A to 18C are plan views illustrating the sealing member 52 formed on the mother board. More specifically, FIG. 18A shows the outward appearance of the mother board, and FIG. 18B is an enlarged view of a portion represented by a character 'E' in FIG. 18A. In addition, FIG. 18C is an enlarged view of a portion represented by a character 'F' in FIG. 18B.

As shown in FIG. 17A, the insulating sealing member 52a is applied onto the mother board 10' for a TFD substrate in the direction of a character 'U' (a second sealing member forming process). As described above, a plurality of TFD forming regions 11 and a plurality of mutual boundary portions 12 are previously formed on the mother board 10' for a TFD substrate, and the insulating sealing member 52a is continuously and collectively applied thereon so as to be laid across the TFD forming regions 11 and the mutual boundary portions 12. The direction of a character 'U' is a direction in which the plurality of TFD forming regions 11 is arranged. The insulating sealing member 52a constitutes portions of the ring-shaped portion 58 and the connecting portion 59 of the liquid crystal display device 100. In this embodiment, the insulating sealing member 52a has concave portions W in the mutual boundary portions 12. In addition, each concave portion W has a first region 59a, which will serve as the connecting portion 59 later.

Next, as shown in FIG. 17B, the conductive sealing member 52b is applied onto the mother board 10' for a TFD substrate in the direction of a character 'V' (a first sealing member forming process). In this process, similar to the above, a plurality of TFD forming regions 11 and a plurality of mutual boundary portions 12 are previously formed on the mother board 10' for a TFD substrate, and the conductive sealing member 52b is continuously and collectively applied thereon so as to be laid across the TFD forming regions 11 and the mutual boundary portions 12. The direction of a character 'V' is a direction in which the plurality of TFD forming regions 11 is arranged. The conductive sealing member 52b constitutes the remaining portions of the ring-shaped portion 58 and the connecting portions 59 of the liquid crystal display device 100. Therefore, the formation of the insulating sealing member 52a and the conductive sealing member 52b causes the ring-shaped portions 58 to be formed in the TFD forming regions 11 and the connecting portions 59 to be formed in the mutual boundary portions 12. In this embodiment, the conductive sealing member 52b has concave portions X in the mutual boundary portions 12. In addition, each concave portion X has a second region 59b, which will serve as the connecting portion 59 later.

The concave portions W of the insulating sealing member 52a are opposite to the concave portions X of the conductive sealing member 52b. That is, the first regions 59a and the second regions 59b are opposite to each other.

In this embodiment, the insulating sealing member 52a is applied in the direction of a character 'U', and the conductive sealing member 52b is applied in the direction of a character 'V' opposite to the direction of a character 'U'. However, the invention is not limited thereto. For example, the insulating sealing member 52a and the conductive sealing member 52b may be applied in the same direction.

Further, in this embodiment, as represented by the characters 'U' and 'V', the insulating sealing member 52a and the conductive sealing member 52b are formed in the vertical direction of the plane of FIGS. 17A and 17B. However, the sealing members 52a and 52b may be formed in the horizontal direction thereof. In both cases, the insulating sealing member 52a and the conductive sealing member 52b are formed in the direction in which the plurality of TFD forming regions 11 is arranged.

Furthermore, in this embodiment, the line widths of the sealing members 52a and 52b are equal to each other. However, the line widths of the sealing members 52a and 52b may different from each other according to where the sealing members 52a and 52b are formed or according to the shape of the connecting portions 59 formed by connection.

The insulating sealing member 52a and the conductive sealing member 52b are applied onto the mother board 10' for a TFD substrate shown in FIG. 18A by the method of forming the sealing member 52, thereby forming the plurality of TFD forming regions 11. As shown in FIG. 18B, a portion of the TFD forming region 11 is formed by the insulating sealing member 52a, and the other portion thereof is formed by the conductive sealing member 52b. In this way, the ring-shaped portion 58 composed of the sealing members 52a and 52b is formed. As shown in FIG. 18C, the insulating sealing member 52a and the conductive sealing member 52b have the concave portions W and X opposite to each other, respectively. As will be described later, when the mother board 10' for a TFD substrate and the mother board 20' for a counter substrate are bonded to each other, respectively, the sealing members 52a and 52b opposite to each other are pressed to cause the first region 59a to come into contact with the second region 59b, and are connected to each other with a large contact area therebetween, resulting in the connecting potions 59 shown in FIG. 4. The ring-shaped portion 58 is formed by the connection between the first region 59a and the second region 59b.

Next, the manufacturing method of the liquid crystal display device will be continuously described with reference to FIG. 14.

Figure 14B:
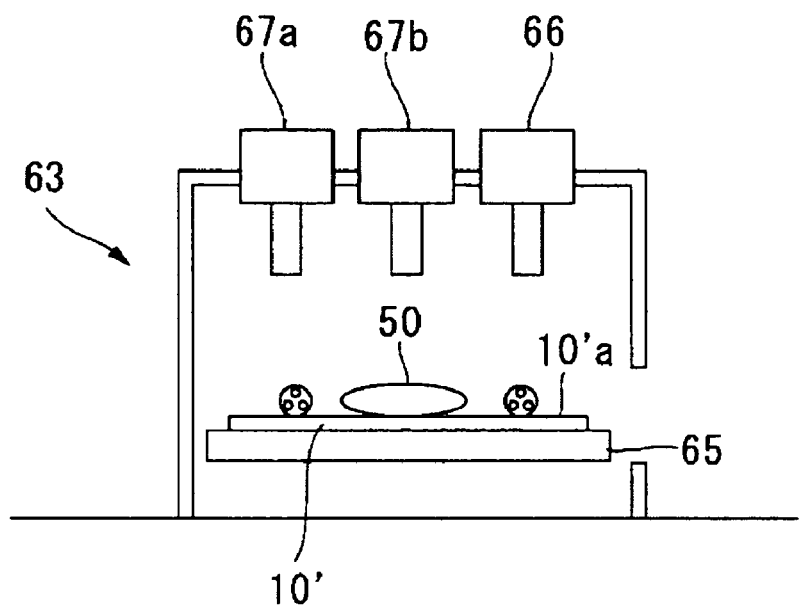

As shown in FIG. 14B, liquid crystal 50 is discharged from the liquid discharging head 66 onto the mother board 10' for a TFD substrate placed on the table 65 in the material supplying unit 63. More specifically, the liquid crystal 50 is discharged from the liquid discharging head 66 onto the sealing surface 10'a while moving the table 65 so as to be placed at predetermined positions on the sealing surface 10'a. The liquid crystal 50 is dropped on the ring-shaped portions 58 of the plurality of TFD forming regions 11.

Further, in this embodiment, it is preferable that the liquid crystal 50 dropped on the sealing surface 10'a of the mother board 10' for a TFD substrate have a viscosity of 130 to 250 Pa·s. The use of the liquid crystal 50 having the viscosity range makes it possible to effectively prevent the liquid crystal 50 from flowing to a bonding region between the sealing members 52a and 52b and the mother board 10' for a TFD substrate, and thus to reliably perform bonding between the mother boards 10' and 20'.

Figure 14C:
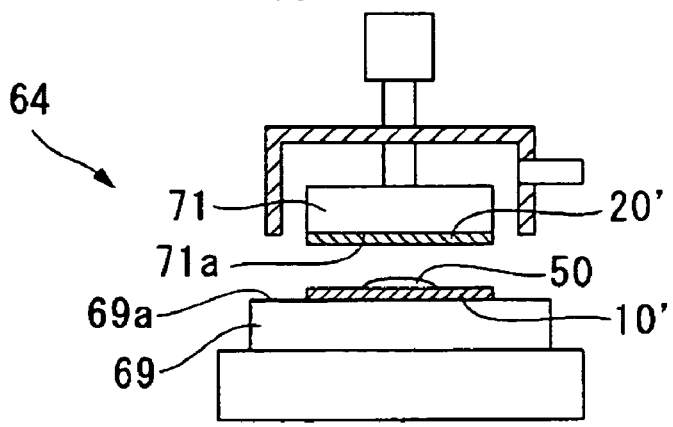

Next, as shown in FIG. 14C, the mother board 20' for a counter substrate is carried by the substrate feeding/removing unit 62 to be placed on the upper chuck portion 71 of the substrate bonding unit 64 with the upper and lower surfaces reversed. Then, the mother board 20' for a counter substrate is held on the holding surface 71a by the holding mechanism.

Meanwhile, the mother board 10' for a TFD substrate having the sealing members 52a and 52b and the liquid crystal 50 arranged thereon is carried by the substrate feeding/removing unit 62 to be placed on the chuck portion 69 of the substrate bonding unit 64, and is then held on the holding surface 69a by the holding mechanism.

In this embodiment, the mother board 20' for a counter substrate is fed to the substrate bonding unit 64 before the mother board 10' for a TFD substrate is fed. Therefore, it is possible to perform the bonding between the mother boards 10' and 20' while maintaining the cleanliness of the sealing surfaces 10'a and 20'a of the mother board 10' for a TFD substrate and the mother board 20' for a counter substrate. When the mother board 10' for a TFD substrate held on the lower chuck portion 69 is fed to the substrate bonding unit 64 prior to the mother board 20' for a counter substrate before the mother board 20' for a counter substrate is fed to the upper chuck portion 71, there is a fear that a foreign matter will be deposited on the mother board 10' for a TFD substrate previously arranged and on the liquid crystal 50 arranged on the sealing surface 10'a.

Further, in this embodiment, a process for forming the sealing members 52a and 52b on the mother board 10' for a TFD substrate and a process for arranging the liquid crystal 50 thereon are performed by a single material supplying unit 63. However, the processes for arranging the sealing members 52a and 52b and the liquid crystal 50 can be performed by using, for example, two material supplying units 63. In this case, the two processes can be performed at the same time, which makes it possible to improve throughput.

Furthermore, in this embodiment, the sealing members 52a and 52b are formed on the mother board 10' for a TFD substrate. However, the sealing members 52a and 52b may be formed on the mother board 20' for a counter substrate. In this case, the sealing members 52a and 52b are continuously and collectively formed so as to be laid across the plurality of counter electrode forming regions 21 and the plurality of mutual boundary portions 22, respectively. In addition, it is preferable that the reversing operation of the mother board 20' for a counter substrate by the substrate feeding/removing unit 62 be performed immediately after the board is discharged from the material supplying unit 63. The sealing members 52a and 52b spread out on the mother board 20' for a counter substrate after application with the passage of time, and thus the height thereof is reduced. In particular, when the viscosity of the sealing member 52 is lower than 200,000 cps, a variation in the height of the applied sealing members becomes more remarkable. Therefore, the mother board 20' for a counter substrate is reversed immediately after the sealing members 52a and 52b are applied, which makes it possible to prevent the sealing members 52a and 52b from spreading out and thus to prevent the droop of the sealing member. As a result, it is possible to maintain high bonding strength between the mother board 10' for a TFD substrate and the mother board 20' for a counter substrate, and thus to manufacture a liquid crystal display device having high reliability.

Further, the sealing member 52a or the sealing member 52b may be formed on the mother board 10' for a TFD substrate, and the other sealing member may be formed on the mother board 20' for a counter substrate. In this case, it is also possible to bond the mother board 10' for a TFD substrate to the mother board 20' for a counter substrate while preventing the droop of the sealing member. In addition, the bonding process is performed after the sealing members 52a and 52b are aligned with each other in position.

Figure 15A:
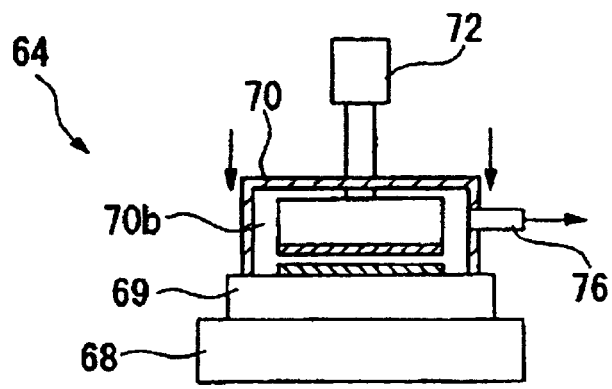
FIGS. 15A to 15C are diagrams illustrating the manufacturing method of the liquid crystal display device according to the invention.

Then, as shown in FIG. 15A, the vacuum chamber 70 is lowered to come into contact with the lower chuck portion 69, thereby sealing the accommodation space 70b. When the accommodation space 70b is sealed, the accommodation space 70b is deflated through the exhaust portion 76 to make the accommodation space 70b in a substantially vacuum state ($1.33$ Pa to $1.33 \times 10^{-2}$ Pa).

Figure 15B:
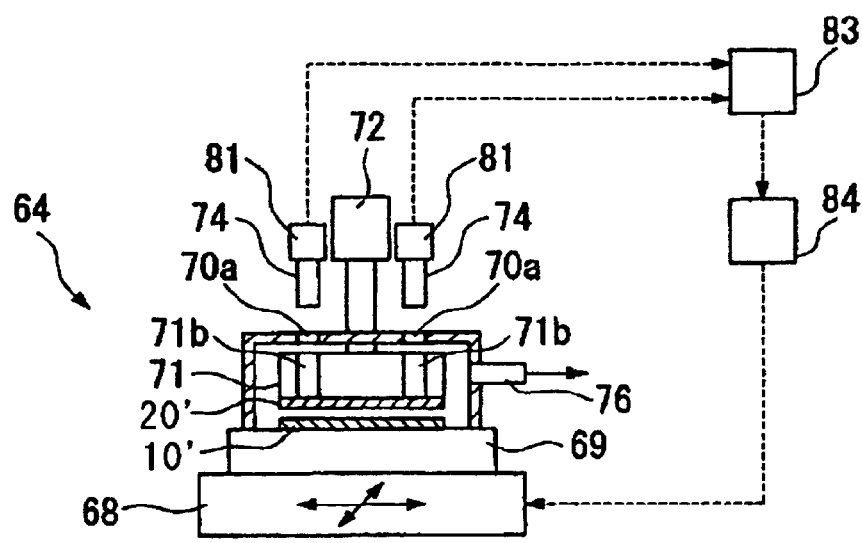

When the accommodation space 70b turns to a substantially vacuum state, alignment marks (not shown) formed on the mother board 10' for a TFD substrate and the mother board 20' for a counter substrate are magnified by the bonding microscopes 74, and the magnified images are captured by the CCD cameras 81, as shown in FIG. 15B. Image data of the alignment marks captured by the CCD cameras 81 is input to the image processing unit 83, and then the relative position between the mother board 10' for a TFD substrate and the mother board 20' for a counter substrate is detected by the image processing unit 83. The control unit 84 drives the table 68, on the basis of the relative position detected by the image processing unit 83, to horizontally move the mother board 20' for a counter substrate such that a deviation in the relative position between the mother board 10' for a TFD substrate and the mother board 20' for a counter substrate is in a range of $\pm 10$ μm.

Further, a process for making the accommodation space 70b vacuous and a process for aligning the mother boards 10' and 20' may be performed at the same time, or the vacuum process may be performed after the alignment process. When the vacuum process and the alignment process are simultaneously performed, it is possible to shorten a manufacturing time.

Furthermore, in the upper chuck portion 71, through holes 71b are formed immediately below the bonding microscopes 74 and the inspection windows 70a, which makes it possible to detect the alignment marks of the mother boards 10' and 20' through the through holes 71b.

Figure 15C:
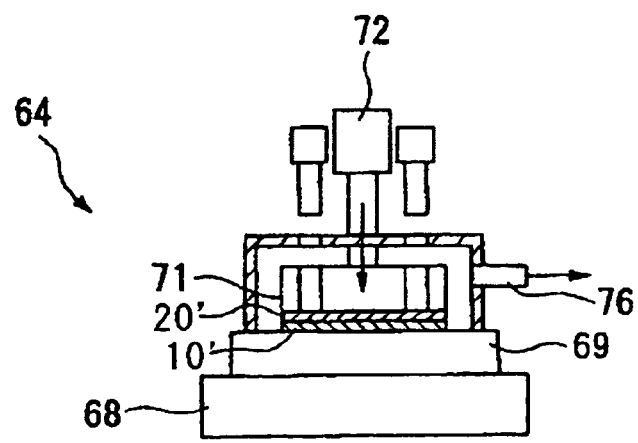

When the mother boards 10' and 20' are aligned with each other, the lowering mechanism 72 lowers (relatively moves) the upper chuck portion 71 to bond the mother boards 10' and 20', as shown in FIG. 15C. Then, the upper chuck portion 71 is lowered to the lower chuck portion 69 to apply pressure to the mother boards 10' and 20', causing the sealing member 52 to be compressed to a predetermined thickness.

When the bonding between the mother boards 10' and 20' is completed, the UV radiating unit 82 radiates ultraviolet rays onto the bonded mother boards to harden the sealing member 52, thereby raising the viscosity of the sealing member.

Further, pressure applied after the mother boards 10' and 20' are bonded to each other may not be performed according to a manufacturing process and the selection of the sealing members 52a and 52b. In addition, the hardening of the sealing member 52 by the UV radiating unit 82 may not be performed according to the type of the sealing member 52.

When it is expected that a positional deviation between the boards will occur between the bonding process and an accurate alignment process, which will be described later, and when the degree of the positional deviation is statistically expected, an offset may be previously performed on the alignment between the mother boards such that the positional relationship between the mother boards 10' and 20' is within the above-mentioned range after the positional deviation occurs.

Figure 16A:
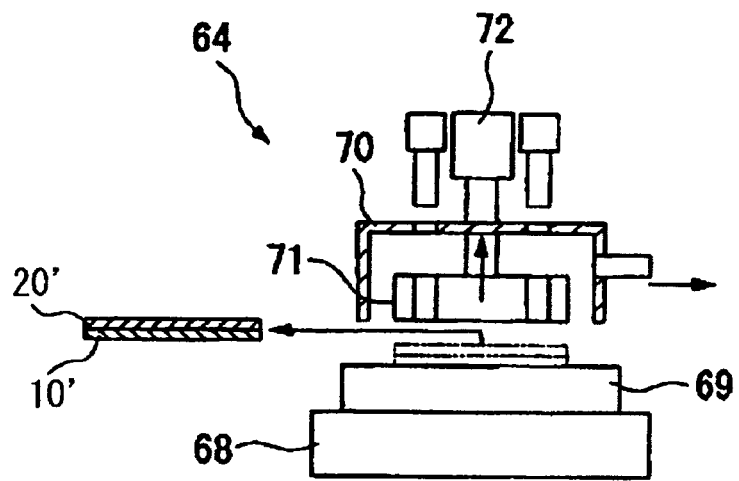
FIGS. 16A and 16B are diagrams illustrating the manufacturing method of the liquid crystal display device according to the invention.

Thereafter, air is introduced into the accommodation space 70b to change the inner state of the accommodation space 70b from the substantially vacuum state to an atmosphere state. When the accommodation space 70b of the vacuum chamber 70 turns to the atmospheric pressure state, pressure is applied to the mother boards 10' and 20', which causes the sealing member 52 to be compressed. Then, the contact between the upper chuck 71 and the lower chuck portion 69 is released, and the vacuum chamber 70 is raised, as shown in FIG. 16A. Subsequently, the substrate (in this case, the liquid crystal display device 100 composed of the mother boards 10' and 20' bonded to each other) mounted on the lower chuck portion 69 in a non-holding state is removed from the substrate feeding/removing unit 62.

Figure 16B:
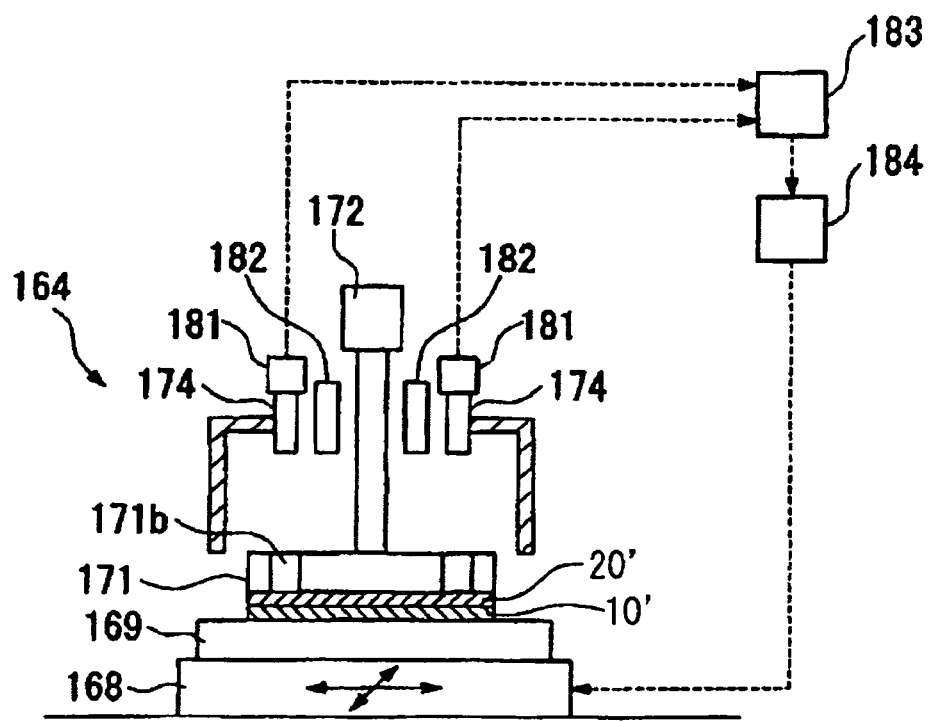

The bonded mother boards 10' and 20' are transferred to the accurate alignment unit 164 by the substrate feeding/removing unit 62 such that the mother boards 20' for a counter substrate is placed on the side of the upper chuck portion 171 and the mother boards 10' for a TFD substrate is placed on the side of the lower chuck portion 169, as shown in FIG. 16B. The upper chuck portion 171 and the lower chuck portion 169 respectively vacuum—absorb the mother boards 10' for a TFD substrate and the mother boards 20' for a counter substrate using the absorbing mechanisms provided therein.

When the mother boards 10' for a TFD substrate and the mother boards 20' for a counter substrate are completely held, the alignment marks (not shown) formed on the mother boards 10' and 20' are magnified by the alignment microscopes 174 and the magnified images are captured by the CCD cameras 181. Then, image data of the alignment marks captured by the CCD cameras 181 is input to the image processing unit 183, and the relative position between the mother board 10' for a TFD substrate and the mother board 20' for a counter substrate is detected by the image processing unit 183. The control unit 184 drives the table 168, on the basis of the relative position detected by the image processing unit 183, to align the mother board 20' for a counter substrate with the mother board 10' for a TFD substrate such that a deviation in the relative position between the mother board 10' for a TFD substrate and the mother board 20' for a counter substrate is in a range of $\pm 1$ μm or less.

Further, in the upper chuck portion 171, through holes 171*b* are formed immediately below the bonding microscopes 174, which makes it possible to detect the alignment marks of the mother boards 10' and 20' through the through holes 171*b*.

When the mother boards 10' and 20' are aligned with each other, a pressing mechanism 172 lowers (relatively moves) the upper chuck portion 171 to press the mother boards 10' and 20' arranged opposite to each other, causing the sealing member 52 to be compressed. Then, the gap control material 52*c* contained in the sealing members 52*a* and 52*b* comes into contact with the mother boards 10' and 20', so that the gap between the mother boards 10' and 20' is adjusted to be smaller than 3 μm.

In this case, the pressing mechanism 172 can press the mother boards by using various pressing methods, such as a pressing method of applying uniform pressure, a pressing method of gradually increasing pressure, a pressing method of continuously applying pressure, and an 'S'-shaped pressing method of applying pressure for a predetermined time and of increasing pressure.

The entire surface of each of the upper chuck portion 171 and the lower chuck portion 169 may come into pressure contact with the mother board 10' for a TFD substrate and the mother board 20' for a counter substrate, or the upper and lower chuck portions 171 and 169 may come into pressure contact with only regions of the mother boards 10' and 20' where the cap control material 52*c* contained in the sealing member 52 is arranged. In a method of pressing only the regions where the cap control material 52*c* is arranged, the other regions where the cap control material 52*c* is not arranged are not pressed, which makes it possible to prevent the gap between the mother boards 10' and 20' from being narrowed due to the baking of the mother boards and to prevent the damage of components due to spacers arranged on the boards.

When the gap between the mother boards 10' and 20' is adjusted, the sealing member 52 is hardened by radiation of ultraviolet rays by the UV lamp 182 to maintain the gap between the mother boards 10' and 20'.

The ultraviolet rays may be radiated by the UV lamp 182 at various times, such as immediately after the pressure of the applying mechanism 172 reaches a predetermined value, or after the liquid crystal 50 is spread out throughout the TFD forming region 11 with the passage of a predetermined time. In addition, in order to obtain a necessary adhesion, a sealing member hardening process may be further provided according to the type of a sealing member to be used.

When the sealing members 52*a* and 52*b* are completely hardened, the holding states of the upper chuck portion 171 and the lower chuck portion 169 are released sequentially or simultaneously, and the liquid crystal display device 100 loaded on the lower chuck portion 69 in a non-holding state is removed from the substrate feeding/removing unit 62.

Then, as shown in FIG. 7C, the bonded mother boards 10' and 20' are cut into a plurality of liquid crystal display devices 100.

Further, in this embodiment, the following bonding processes [1] to [8] are performed by using the device manufacturing apparatus 61:

[1] Set the mother boards 10' and 20' on a table;
[2] Make the accommodation space 70*b* vacuous;
[3] Roughly align the boards 10' and 20';
[4] Temporarily fix the mother boards 10' and 20' by radiation of ultraviolet rays;
[5] Open the accommodation space 70*b* under the atmosphere;
[6] Transfer the mother boards 10' and 20' to the accurate alignment unit 164;
[7] Accurately align the mother boards 10' and 20'; and
[8] Fix the mother boards 10' and 20' by the radiation of ultraviolet rays.

However, the invention is not limited to the above-mentioned bonding processes. For example, the following bonding processes [1] to [11] may be performed:

[1] Set the mother boards 10' and 20' on a table;
[2] Make the accommodation space 70*b* vacuous;
[3] Lower the upper chuck portion 71 to a predetermined position;
[4] Roughly align the boards 10' and 20';
[5] Further lower the upper chuck portion 71;
[6] Accurately align the mother boards 10' and 20';
[7] Apply pressure to the mother boards 10' and 20' to fix them;
[8] Temporarily fix the mother boards 10' and 20' by radiation of ultraviolet rays;
[9] Turn an electrostatic chuck off, and raise the upper chuck portion 71;
[10] Open the accommodation space 70*b* under the atmosphere; and
[11] Fix the mother boards 10' and 20' by the radiation of ultraviolet rays.

In the above-mentioned bonding processes [1] to [11], since the accurate alignment process is not performed under the atmosphere, it is possible to reliably bond the mother boards 10' and 20'.

As described above, in the liquid crystal display device 100 and the manufacturing method thereof according to this embodiment, the sealing members 52*a* and 52*b* constitute the ring-shaped portion 58 and the connecting portions 59. Therefore, the ring-shaped portion 58 is formed in a closed shape by portions of the connecting portions 59, which makes it possible to prevent the leakage of the liquid crystal 50 from the connecting portions 59 and thus to improve the reliability of the liquid crystal display device 100. In addition, since the connecting portions 59 are formed to extend toward the outside of the ring-shaped portion 58, the connecting portions 59 have large widths at only the outside of the ring-shaped portion 58 when the bonding process is performed, and thus it is possible to prevent the sealing members 52*a* and 52*b* from protruding toward the inside of the ring-shaped portion 58. Further, it is possible to maintain a uniform cell gap, without having an effect on the cell gap inside the ring-shaped portion 58.

Furthermore, the ring-shaped portion 58 and the connecting portions 59 can be formed with materials having the same width, compared with the related art, which makes it possible to easily form the sealing members 52*a* and 52*b*. As a result, it is possible to easily control a dispenser and to form the sealing members 52*a* and 52*b* at a short time. In addition, a variation in the amount of a sealing material remaining in the dispenser or a variation in the viscosity of the sealing material between lots may be left out of consideration, and thus the shapes of the sealing members 52*a* and 52*b* can be easily managed.

Since the conductive sealing member 52*b* electrically connects the connection pads 54 to the COM electrodes 57, it is possible to hold the liquid crystal layer 50 inside the ring-shaped portion 58 and to electrically connect the connection pads 54 to the COM electrodes 57. In addition, since the insulating sealing member 52*a* is formed in non-conductive regions on the surfaces of the SEG electrodes 56 and the extending lines 55, it is possible to hold the liquid crystal layer 50 inside the ring-shaped portion 58 and to obtain an electrical insulating property in the non-conductive regions.

The insulating sealing member 52a and the conductive sealing member 52b make it possible to form the ring-shaped portion 58 having an electrical insulating property and conductivity and the connecting portions 59 of a conductive member and an electrical insulating member. In this case, since the connecting portion 59 is formed between the conductive region and the non-conductive region to extend toward the outside of the ring-shaped portion 58, the connecting portions 59 have large widths at only the outside of the ring-shaped portion 58 when the bonding process is performed, and thus it is possible to prevent the sealing members 52a and 52b from protruding toward the inside of the ring-shaped portion 58. Further, it is possible to maintain a uniform cell gap, without having an effect on the cell gap inside the ring-shaped portion 58.

Further, a plurality of liquid crystal display devices 100 are formed by bonding the mother board 10' for a TFD substrate to the mother board 20' for a counter substrate and then by cutting the bonded mother boards. Therefore, it is possible achieve a manufacturing method having high productivity.

Furthermore, in the manufacturing method of the liquid crystal display device 100, the insulating sealing member 52a is continuously and collectively applied so as to be laid across the TFD forming regions 11 and the mutual boundary portions 12, and the conductive sealing member 52b is continuously and collectively applied thereon. The invention can obtain better effects than those in the related art.

More specifically, a process from the start of the formation of the conductive sealing member 52b to the end of the formation of the conductive sealing member 52b and a process from the start of the formation of the insulating sealing member 52a to the end of the formation of the insulating member 52a make it possible to collectively form the sealing members 52a and 52b in the direction in which the plurality of TFD forming regions 11 is arranged, respectively. As a result, the sealing members 52a and 52b can be easily and rapidly performed, which makes it possible to achieve a manufacturing method having high productivity.

Meanwhile, when the sealing members 52a and 52b are formed in each of the plurality of TFD forming regions 11 as in the related art, the start of the formation of the sealing members 52a and 52b to the end of the formation of the sealing members 52a and 52b should be performed on each TFD forming region 11, which results in an increase in the number of sealing member forming processes. In this case, operations for starting and stopping discharging a sealing material are repeatedly performed, which makes it difficult for the sealing member to stably flow in the dispenser. As a result, a variation in the amount of a sealing material to be discharged easily occurs. In addition, the dispenser should scan the mother board 10' for a TFD substrate, and thus the operation of the dispenser is complicated.

In contrast, in this embodiment, the conductive sealing member 52b and the insulating sealing member 52a are continuously and collectively formed in the direction in which the TFD forming regions 11 are arranged. Therefore, the start of the formation of the sealing material and the end of the formation of the sealing material can be performed for every column or row of TFD forming regions 11, which makes it possible to reduce the number of start operations of the formation of the sealing material and the number of end operations of the formation of the sealing material. As a result, it is possible to collectively and continuously form the conductive sealing member 52b and the insulating sealing member 52a while allowing the sealing material to stably flow in the dispenser. In addition, it is possible to form the sealing members 52a and 52b at a short time. Since the dispenser does not scan the mother board 10' for a TFD substrate in a non-discharge state, it is possible to prevent the sealing material filled into the dispenser from uselessly being discharged. Therefore, the operation of the dispenser can be simplified, and a variation in the viscosity of a sealing material and a variation in the discharge amount of the sealing material can be prevented.

Further, since the sealing members 52a and 52b formed in each TFD forming region 11 by the above-mentioned method are connected to each other by the connecting portions 59, it is possible to prevent the leakage of the liquid crystal 50 from the mutual boundary portions 12.

Next, second to sixth embodiments of the liquid crystal display device will be described.

In the following description, only different portions from the first embodiment will be described. In addition, the same components as those in the first embodiment have the same reference numerals and a description thereof will be omitted.

Second Embodiment of the Liquid Crystal Display Device

First, the second embodiment of the liquid crystal display device according to the invention will be described.

Figure 19:
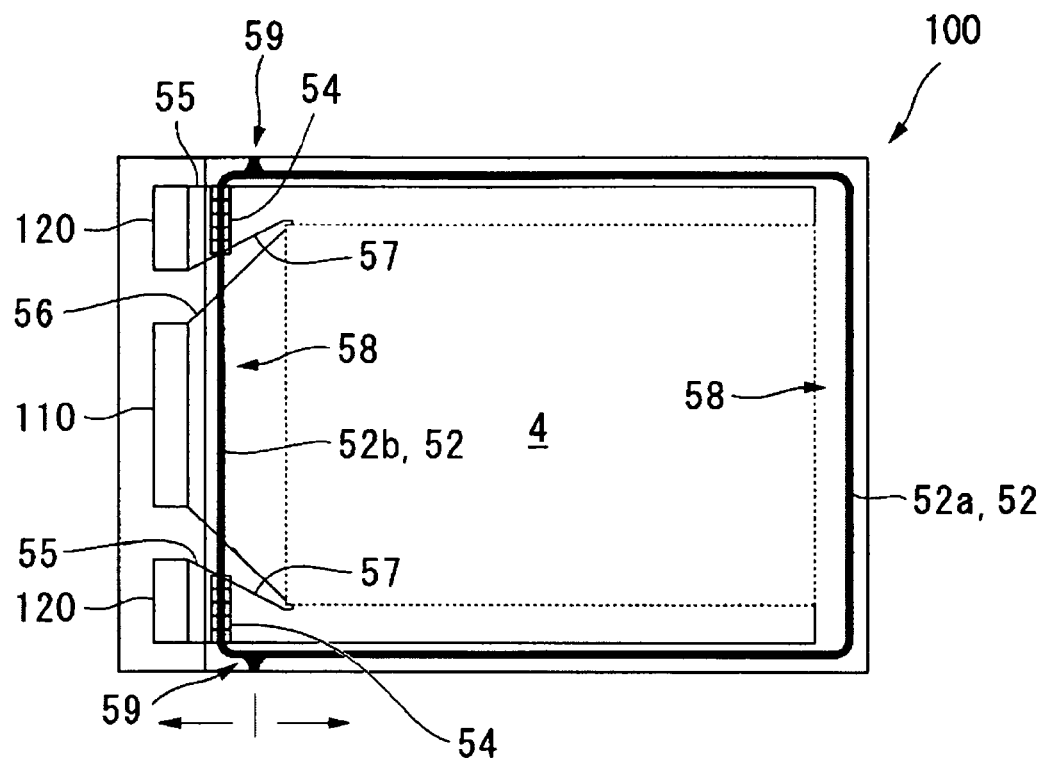
FIG. 19 is a plan view illustrating a liquid crystal display device according to a second embodiment of the invention.

FIG. 19 is a plan view of components constituting the liquid crystal display device according to this embodiment, as viewed from a counter substrate. In this embodiment, the conductive sealing member 52b is formed between the image display region 4 and the scanning signal driving circuit 110, and the insulating sealing member 52a is formed opposite to the conductive sealing member 52b with the connecting portions 59 interposed therebetween. That is, in this embodiment, the positions of the insulating sealing member 52a and the conductive sealing member 52b are opposite to those in the first embodiment.

Further, connection pads 54 are formed on the side of data signal driving circuits 120 on the TFD substrate 10 to be connected thereto through extending lines 55. Meanwhile, COM electrodes 57 are formed outboard of an image display region 4 on the counter substrate 20 so as to extend to the connection pads 54. The conductive sealing member 52b is interposed between the COM electrodes 57 and the connection pads 54 such that conductive particles thereof are electrically connected to the COM electrodes 57 and the connection pads 54. Since the conductive sealing member 52b is formed on wiring lines for the SEG electrodes 56, a short circuit can be formed between the wiring lines for the SEG electrodes 56 and wiring lines adjacent thereto.

As such, even when the conductive sealing member 52b is formed between the image display region 4 and the scanning signal driving circuit 110, the same effects as those in the first embodiment can be obtained.

Third Embodiment of the Liquid Crystal Display Device

Next, the third embodiment of the liquid crystal display device according to the invention will be described.

Figure 20:
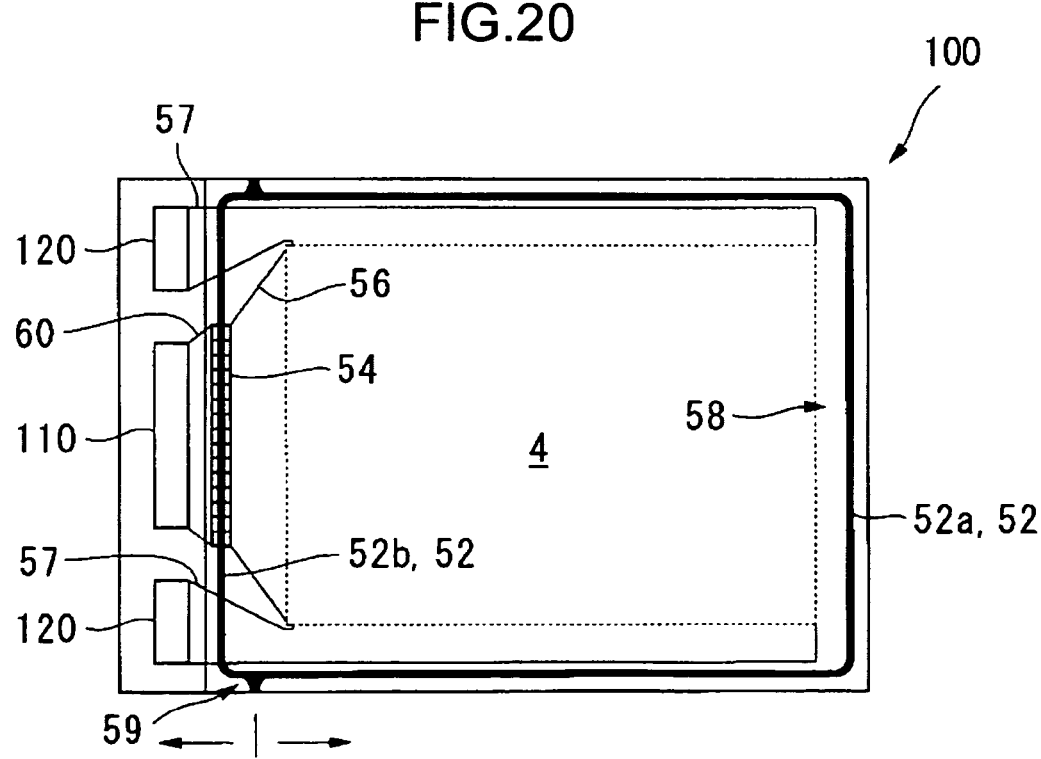
FIG. 20 is a plan view illustrating a liquid crystal display device according to a third embodiment of the invention.

FIG. 20 is a plan view of components constituting the liquid crystal display device according to this embodiment, as viewed from a counter substrate. Similar to the second embodiment, in this embodiment, the conductive sealing member 52b is formed between the image display region 4 and the scanning signal driving circuit 110, and the conductive sealing member 52b is opposite to the insulating sealing member 52a with connecting portions 59 interposed therebetween.

This embodiment differs from the first and second embodiments in that the scanning signal driving circuit 110 and the data signal driving circuits 120 are formed on a counter substrate 20. Therefore, the scanning signal driving circuit 110 is connected to the SEG electrodes 56 through the connection pads 54.

Accordingly, the connection pads 54 are formed on the side of a scanning signal driving circuit 110 on the counter substrate 20 to be connected thereto through extending lines 60. In addition, data signal driving circuits 120 are connected to pixel electrodes 9 through COM electrodes 57. Meanwhile, the SEG electrodes 56 are formed outboard of an image display region 4 on the TFD substrate 10 so as to extend toward the connection pads 54. The conductive sealing member 52b is interposed between the SEG electrodes 56 and the connection pads 54 such that conductive particles thereof are electrically connected to the SEG electrodes 56 and the connection pads 54. Since the conductive sealing member 52b is formed on wiring lines for the COM electrodes 57, a short circuit can be formed between the wiring lines for the COM electrodes 57 and wiring lines adjacent thereto.

As such, even when the conductive sealing member 52b is formed between the image display region 4 and the scanning signal driving circuit 110, the same effects as those in the first and second embodiments can be obtained.

Further, in the first to third embodiments, an active matrix liquid crystal display device using the TFD elements 40 as switching elements is used, but the invention is not limited thereto. For example, a passive liquid crystal display device can be used.

Fourth Embodiment of the Liquid Crystal Display Device

Next, the fourth embodiment of the liquid crystal display device according to the invention will be described.

Figure 21:
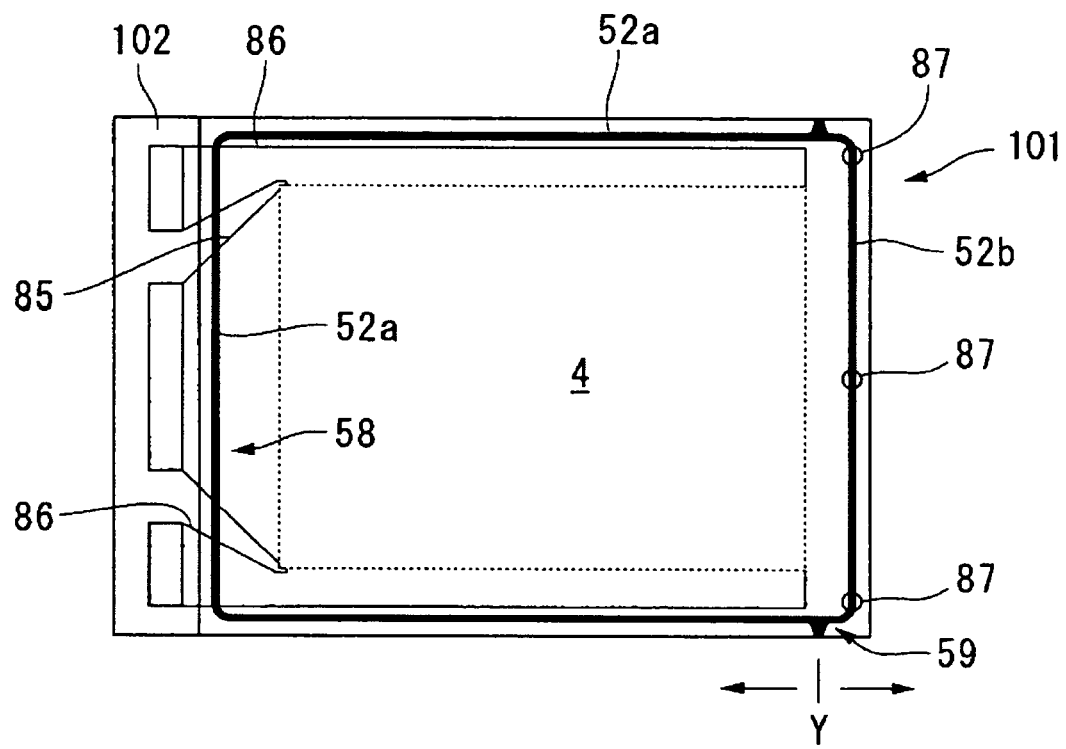
FIG. 21 is a plan view illustrating a liquid crystal display device according to a fourth embodiment of the invention.

In this embodiment, an active matrix liquid crystal display device using thin film transistors (hereinafter, referred to as TFTs) as switching elements is used. FIG. 21 is a plan view of components constituting the liquid crystal display device according to this embodiment, as viewed from a counter substrate.

In the liquid crystal display device using TFD elements according to the first to third embodiments, a voltage is applied from the SEG electrodes 56 of the TFD substrate 10 to the pixel electrodes 31, and a voltage is applied from the COM electrodes 57 of the counter substrate 20 to the pixel electrodes 9, thereby applying a voltage to the liquid crystal layer 50 between the pixel electrodes 31 and 9. That is, the TFD element is a two-terminal element.

On the other hand, in the liquid crystal display device including the TFTs according to this embodiment, potential is applied to pixel electrodes by signals supplied from data lines and gate lines which are formed on a TFT substrate, and a voltage generated between the pixel electrodes and a counter electrode formed on the entire surface of a counter substrate is applied to the liquid crystal layer 50. That is, the TFT is a three-terminal element.

As shown in FIG. 21, a liquid crystal display device 101 has data lead lines 85, gate lead lines 86, an insulating sealing member 52a, a conductive sealing member 52b, and spot connection portions (first connecting portions, connecting regions) 87 on the TFT substrate 102. The insulating sealing member 52a is formed on the left side of a portion represented by a character 'Y', and the conductive sealing member 52b is formed on the right side of the portion represented by a character 'Y'. The liquid crystal layer 50 is held inside a ring-shaped portion 58 surrounded by the sealing members 52a and 52b, thereby forming an image display region 4. In addition, connecting portions 59 are formed on the line represented by the character 'Y'. The conductive sealing member 52b extends on the spot connection portions 87. That is, when the TFT substrate 102 is bonded to the counter substrate, the TFT substrate 102 is electrically connected to the counter substrate through the spot connection portions 87.

As such, in the liquid crystal display device 101 using the TFTs, the conductive sealing member 52b is formed on the spot connection portions 87, which makes it unnecessary to use a spot sealing member for connection between the upper and lower substrates, which has been used in the related art.

Modification of the Fourth Embodiment of the Liquid Crystal Display Device

Figure 22:
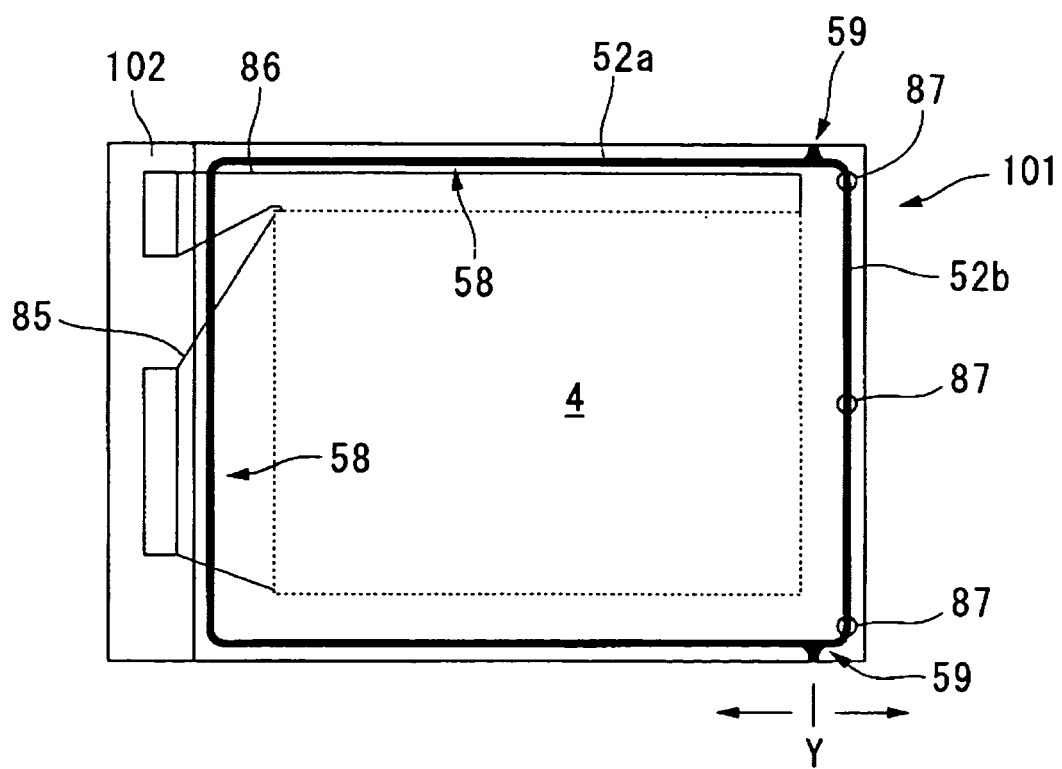
FIG. 22 is a plan view illustrating a liquid crystal display device according to a modification of the fourth embodiment of the invention.

FIG. 22 is a plan view of components constituting a liquid crystal display device according to a modification of the fourth embodiment, as viewed from a counter substrate.

In this modification, gate lead lines 86 are formed on only one side of the image display region 4, as shown in FIG. 22.

This structure also makes it possible to obtain the same effects as those in the fourth embodiment.

Fifth Embodiment of the Liquid Crystal Display Device

Next, the fifth embodiment of the liquid crystal display device according to the invention will be described.

Figure 23:
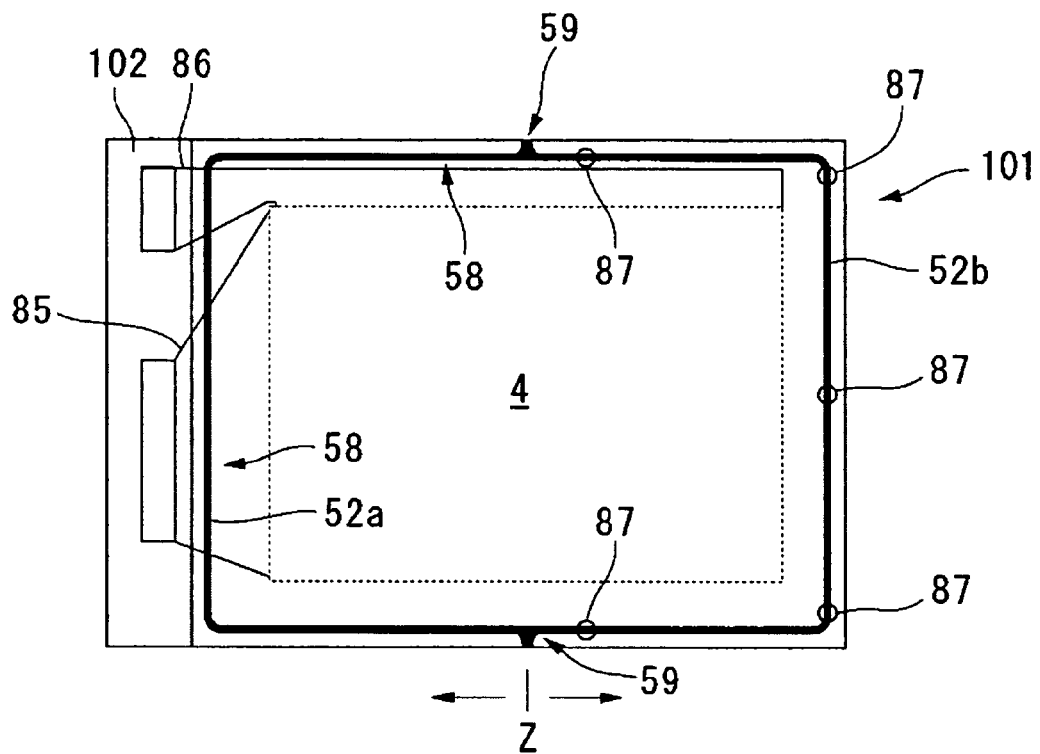
FIG. 23 is a plan view illustrating a liquid crystal display device according to a fifth embodiment of the invention.

FIG. 23 is a plan view of components constituting the liquid crystal display device according to this embodiment, as viewed from a counter substrate. In addition, the liquid crystal display device according to this embodiment has TFTs as switching elements, similar to the fourth embodiment.

As shown in FIG. 23, in a liquid crystal display device 101, the length of an insulating sealing member 52a is equal to that of a conductive sealing member 52b in a ring-shaped portion 58. In this embodiment, the other structures are the same as those in the fourth embodiment. More specifically, a connecting portion 59 is arranged substantially at the center of one side of the ring-shaped portion 58, and the conductive sealing member 52b is formed on the right side of a portion represented by a character 'Z'. In addition, the insulating sealing member 52a is formed on the left side of the portion. In this way, the length of the insulating sealing member 52a is equal to the length of the conductive sealing member 52b.

In this structure, when the sealing members 52a and 52b are formed by two separate dispensers, it is possible to make the tact-times of the dispensers coincide with each other, and thus to effectively manufacture the liquid crystal display device 101. In addition, the TFT substrate 102 and the counter substrate are electrically connected to each other by the conductive sealing member 52b formed on the spot connection portions 87.

Sixth Embodiment of the Liquid Crystal Display Device

Next, the sixth embodiment of the liquid crystal display device according to the invention will be described.

Figure 24:
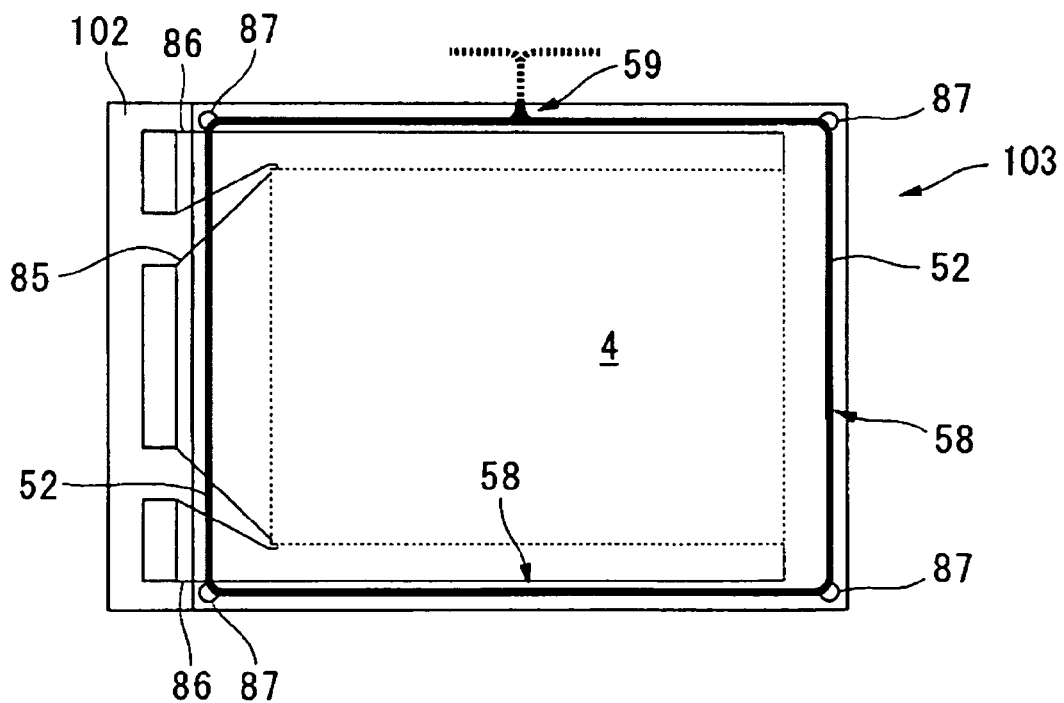
FIG. 24 is a plan view illustrating a liquid crystal display device according to a sixth embodiment of the invention.

FIG. 24 is a plan view of components constituting the liquid crystal display device according to this embodiment, as viewed from a counter substrate. In addition, the liquid crystal display device according to this embodiment has TFTs as switching elements, similar to the fourth embodiment, and can be used for large displays such as a large television.

As shown in FIG. 24, a liquid crystal display device 103 includes one sealing member 52. More specifically, in the first to fifth embodiments, the sealing member 52 is formed by both the conductive sealing member and the insulating sealing member. However, in this embodiment, the sealing member 52 includes only the insulating sealing member.

In the liquid crystal display device 103, a ring-shaped portion 58 has a liquid crystal layer 50 inboard thereof, and one connecting portion 59 blocks up the ring-shaped portion 58. The ring-shaped portion 58 and the connecting portion 59 are continuously and collectively formed by applying the sealing member 52 at once. In other words, the sealing member 52 is formed from an end of one member toward the other end thereof, and has the connecting portion 59 for connecting the one end and the other end. In addition, the liquid crystal layer 50 is held inboard of the ring-shaped portion 58 surrounded by the one member. Here, the connecting portion 59 is formed to extend toward the outside of the ring-shaped portion 58, not to overlap the ring-shaped portion 58.

Further, conductive members different from the sealing member 52 are formed in the spot connection portions 87, and the TFT substrate 102 and the counter substrate are electrically connected to each other by the spot connection portions 87.

In this way, since the ring-shaped portion 58 is formed in a closed shaped by the connecting portion 59 for connecting the one end and the other end of the sealing member 52, it is possible to reduce the number of connecting portions 59 to the minimum and thus to achieve a liquid crystal display device capable of reliably preventing a cell gap defect, compared with the case in which a plurality of connecting portions 59 is provided. In addition, since the connecting portion 59 is formed to extend toward the outside of the ring-shaped portion 58, the connecting portion 59 have a large width at only the outside of the ring-shaped portion 58 when the bonding process is performed, and thus it is possible to prevent the sealing member 52 from protruding toward the inside of the ring-shaped portion 58. Further, it is possible to maintain a uniform cell gap, without having an effect on the cell gap inside the ring-shaped portion 58.

Electronic Apparatus

Next, examples of an electronic apparatus according to the invention will be described.

Figure 25A:
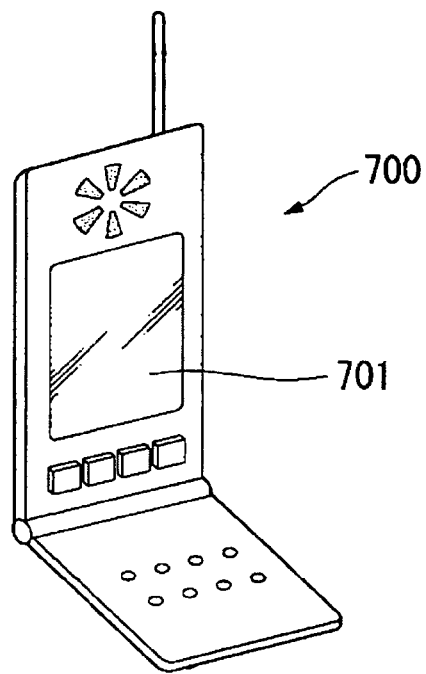
FIGS. 25A to 25C are perspective views illustrating an electronic apparatus according to the invention.

FIG. 25A is a perspective view illustrating an example of a cellular phone. In FIG. 25A, reference numeral 700 denotes a cellular phone body, and reference numeral 701 denotes a liquid crystal display unit including the liquid crystal display device according to the above-described embodiments.

Figure 25B:
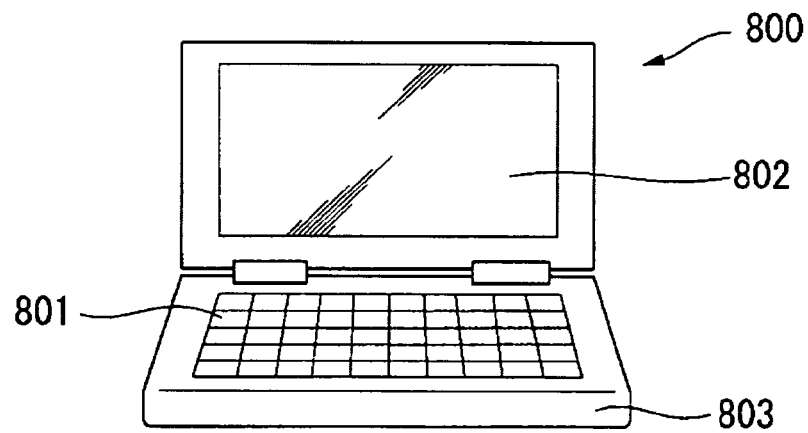

FIG. 25B is a perspective view illustrating an example of a portable information processing apparatus such as a word processor or a personal computer. In FIG. 25B, reference numeral 800 denotes an information processing apparatus, and reference numeral 801 denotes an input unit such as a keyboard. In addition, reference numeral 803 denotes a main body of the information processing apparatus, and reference numeral 802 denotes a liquid crystal display unit including the liquid crystal display device according to the above-described embodiments.

Figure 25C:
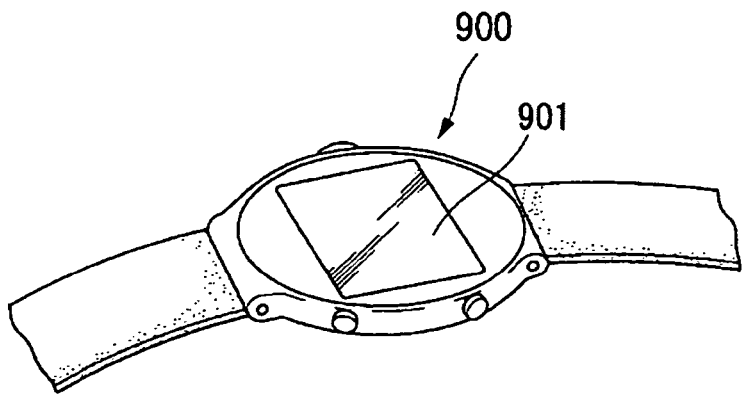
Figure 27:
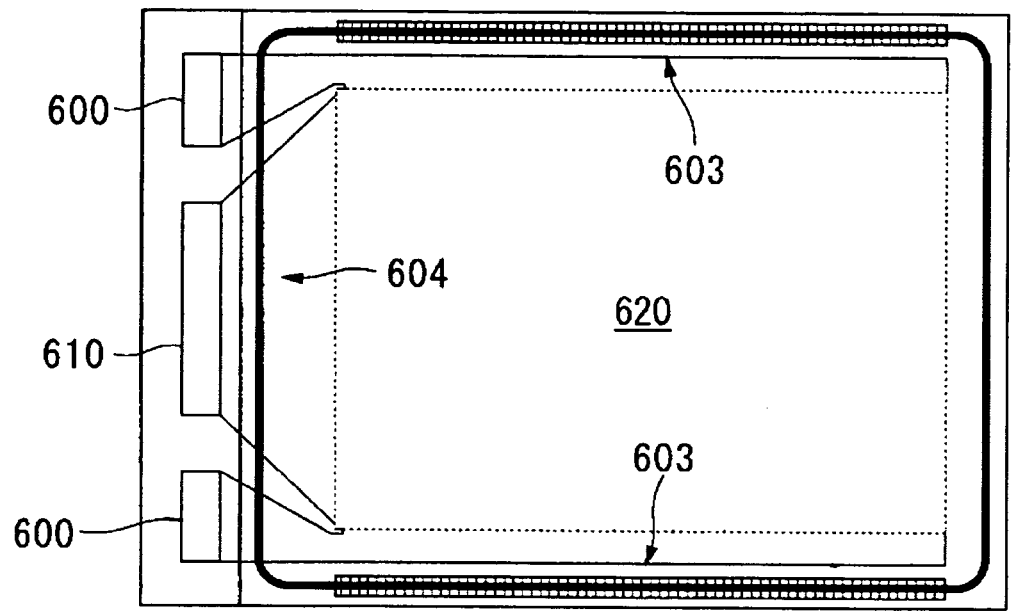
FIG. 27 is a diagram illustrating the related art.
Figure 28:
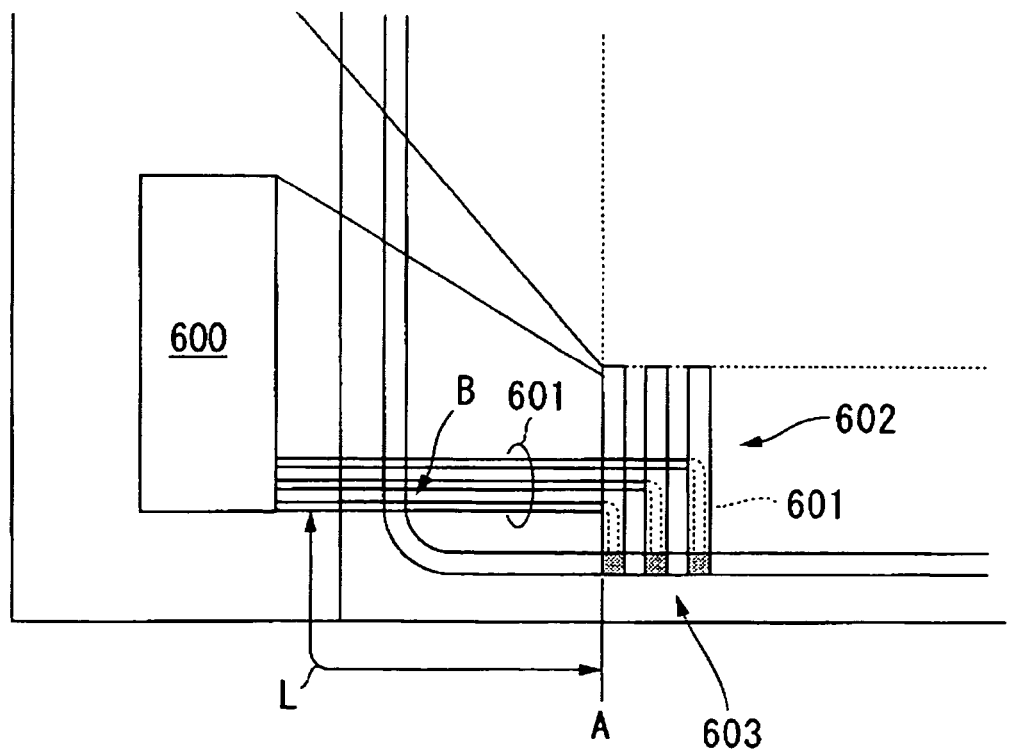
FIG. 28 is a diagram illustrating the related art.

FIG. 25C is a perspective view illustrating an example of a wristwatch-type electronic apparatus. In FIG. 25C, reference numeral 900 denotes a wristwatch body, and reference numeral 901 denotes a liquid crystal display unit including the liquid crystal display device according to the above-described embodiments.

Since the electronic apparatuses shown in FIGS. 25A to 25C each include the liquid crystal display device according to the above-described embodiments, they have display units capable of displaying images with high quality and reliability.

What is claimed is:

1. A liquid crystal display device comprising:
   a first substrate;
   a second substrate;
   a liquid crystal layer interposed between the first and second substrates; and
   a closed sealing member formed in peripheral portions of the first and second substrates,
   wherein the closed sealing member includes:
      a ring-shaped continuous portion that seals the liquid crystal layer therein, the ring-shaped continuous portion including a first sealing member made from a first material and a second sealing member made from a second material, the second material being different from the first material; and
      a connecting portion for forming the ring-shaped continuous portion, the connecting portion including a first connecting portion and a second connecting portion;
      the first connecting portion connecting one end of the first sealing member and one end of the second sealing member, the second connecting portion connecting another end of the first sealing member and another end of the second sealing member, each of the first and second connecting portions protruding from the ring-shaped continuous portion and extending to at least one of an edge of the first substrate and an edge of the second substrate, and each of the first and second connecting portions including a first part and a second part that abut each other to seal the liquid crystal layer in the closed sealing member, the first part being continuous with the first sealing member, and the second part being continuous with the second sealing member.

2. The liquid crystal display device according to claim 1, wherein the first sealing member is formed of a conductive material, and is formed in a conductive region for electrically connecting a first connection portion on the first substrate to a second connection portion on the second substrate.

3. The liquid crystal display device according to claim 1, wherein the second sealing member is formed of an insulating material, and is formed in a non-conductive region for electrically insulating the first substrate from the second substrate.

4. An electronic apparatus comprising the liquid crystal display device according to claim 1.

5. A method of manufacturing a liquid crystal display device comprising:
   continuously forming a sealing member on a first mother board by continuously discharging a sealing material using a dispenser;
   bonding the first mother board and a second mother board interposing a liquid crystal layer therebetween; and
   cutting the bonded first and second mother boards,
   wherein the first mother board includes a plurality of element regions;
   wherein continuously forming the sealing member includes forming the sealing member across the plurality of element regions along a first direction in which the element regions are arranged;

wherein the sealing member forms a connecting portion such that one of the plurality of element regions is surrounded by a ring-shaped continuous closed portion at least after bonding the first mother board and the second mother board, the ring-shaped continuous closed portion sealing the liquid crystal layer to an inside of the ring-shaped continuous closed portion;

the ring-shaped continuous closed portions includes a plurality of corners and a plurality of sides, each side extending between two of the corners in a second direction that intersects the first direction; and the connecting portion protrudes from a position of one of the sides separated from the corresponding corners, toward an outside of the ring-shaped continuous closed portion.

6. A method of manufacturing a liquid crystal display device comprising:

continuously forming a first sealing member on a first mother board by continuously discharging a first sealing material using a dispenser;

continuously forming a second sealing member on one of the first mother board and a second mother board by continuously discharging a second sealing material using a dispenser;

bonding the first mother board and the second mother board interposing a liquid crystal layer therebetween; and cutting the bonded first and second mother boards, wherein the first mother board includes a plurality of element regions;

continuously forming the first sealing member includes forming the first sealing member across the plurality of element regions along a first direction in which the element regions are arranged;

the first sealing member and the second sealing member form a connecting portion such that one of the plurality of element regions is surrounded by a ring-shaped continuous closed portion at least after bonding the first mother board and the second mother board, the ring-shaped continuous closed portion sealing the liquid crystal layer to an inside of the ring-shaped continuous closed portion;

the ring-shaped continuous closed portion including a plurality of corners and a plurality of sides, each side extending between two of the corners in a second direction that intersects the first direction; and the connecting portion protrudes from a position of one of the sides separated from the corresponding corners, toward an outside of the ring-shaped continuous closed portion.

7. The method of manufacturing a liquid crystal display device according to claim 6, wherein the ring-shaped continuous closed portion is formed so that a length of the first sealing member is equal to that of the second sealing member.

8. The method of manufacturing a liquid crystal display device according to claim 6, wherein forming the second sealing member is performed on the second mother board.

9. The method of manufacturing a liquid crystal display device according to claim 6, wherein forming the second sealing member is performed on the first mother board.

* * * * *